(12) United States Patent
Tupper et al.

(10) Patent No.: US 9,664,211 B2
(45) Date of Patent: May 30, 2017

(54) SHAPE MEMORY POLYMER DEVICES

(71) Applicant: Composite Technology Development, Inc., Lafayette, CO (US)

(72) Inventors: Mike Tupper, Lafayette, CO (US); Robert Taylor, Superior, CO (US); Dana Turse, Broomfield, CO (US); Doug Richardson, Westminster, CO (US); Larry G. Adams, Thornton, CO (US); Philip N. Keller, Longmont, CO (US)

(73) Assignee: COMPOSITE TECHNOLOGY DEVELOPMENT, INC., Lafayette, CO (US)

( * ) Notice: Subject to any disclaimer, the term of this patent is extended or adjusted under 35 U.S.C. 154(b) by 314 days.

(21) Appl. No.: 14/046,732

(22) Filed: Oct. 4, 2013

(65) Prior Publication Data

US 2014/0026390 A1  Jan. 30, 2014

Related U.S. Application Data

(63) Continuation of application No. 13/456,606, filed on Apr. 26, 2012, now abandoned.

(60) Provisional application No. 61/586,225, filed on Jan. 13, 2012, provisional application No. 61/524,612, filed on Aug. 17, 2011.

(51) Int. Cl.
*F16B 1/00* (2006.01)
*E05B 47/00* (2006.01)

(52) U.S. Cl.
CPC ........ *F16B 1/0014* (2013.01); *E05B 47/0009* (2013.01); *Y10T 29/49844* (2015.01); *Y10T 29/49865* (2015.01); *Y10T 29/49947* (2015.01); *Y10T 403/21* (2015.01); *Y10T 403/213* (2015.01)

(58) Field of Classification Search
CPC ...................................... F16B 1/0014
USPC .......................... 411/82.5, DIG. 2
See application file for complete search history.

(56) References Cited

U.S. PATENT DOCUMENTS

| | | | | |
|---|---|---|---|---|
| 3,613,732 A | * | 10/1971 | Willson | F03G 7/065 137/625.44 |
| 4,743,079 A | * | 5/1988 | Bloch | F16B 1/0014 285/308 |
| 6,388,043 B1 | * | 5/2002 | Langer | B29C 61/003 525/415 |
| 7,210,884 B2 | * | 5/2007 | Shindoh | F16B 1/0014 403/28 |
| 7,610,783 B2 | * | 11/2009 | Rudduck | B62D 27/00 24/602 |

(Continued)

*Primary Examiner* — Flemming Saether

(57) ABSTRACT

Various shape memory polymer (SMP) devices are disclosed. Many of these SMP devices can be used as attachment and/or release mechanisms for any number of different applications. These SMP devices can use various characteristics of the SMP material to allow for various shape changes. These shape changes, in some embodiments, can be used to provide for release and/or attachment devices, for example, SMP bolts, SMP screws, SMP collars, SMP pillars, SMP panels, and/or SMP rivets, to name a few. An SMP device can include a first geometric state and a second geometric shape. The first geometric shape can restrict motion of two distinct objects relative to one another and the second geometrical shape can allow motion of two distinct objects relative to one another.

13 Claims, 38 Drawing Sheets

(56) References Cited

U.S. PATENT DOCUMENTS

| | | | | |
|---|---|---|---|---|
| 7,699,568 B2* | 4/2010 | Sugiyama | ............... | F16B 5/02 411/353 |
| 7,753,632 B2* | 7/2010 | Naitou | ............... | F16B 1/0014 411/390 |
| 8,366,368 B2* | 2/2013 | Sundholm | ............ | F16B 1/0014 411/517 |
| 2003/0170092 A1* | 9/2003 | Chiodo | ............... | F16B 1/0014 411/82.5 |
| 2010/0154181 A1* | 6/2010 | Flanigan | ............ | B29C 39/003 24/453 |

* cited by examiner

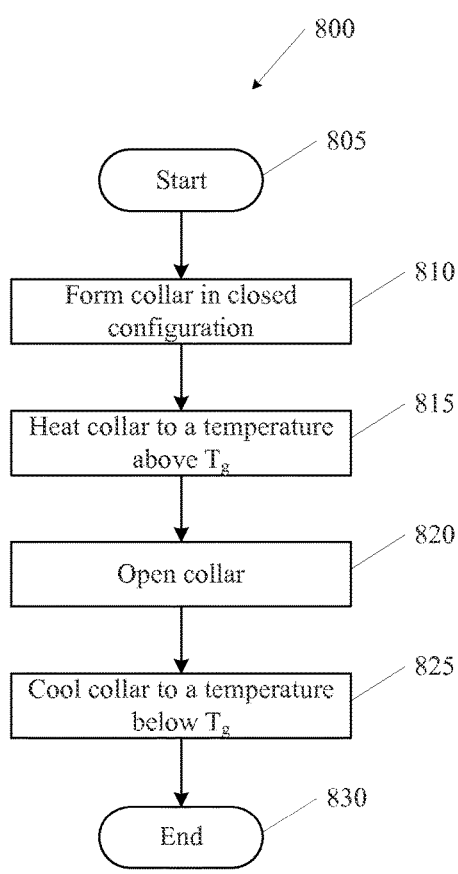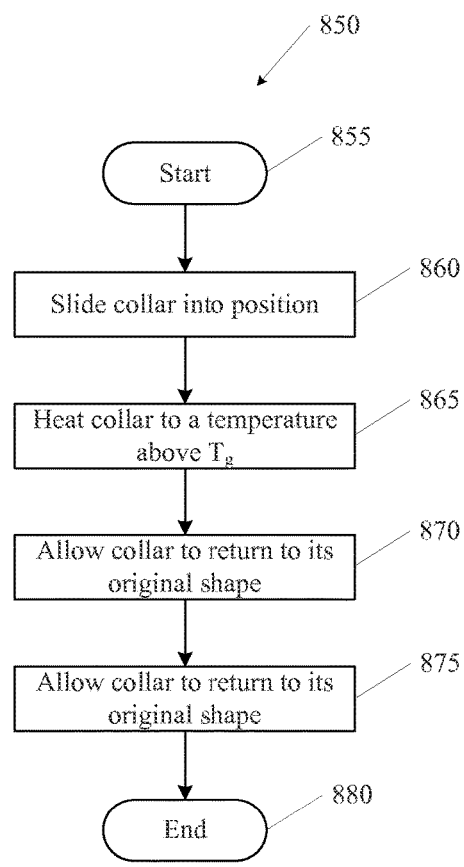
Figure 8A
Figure 8B

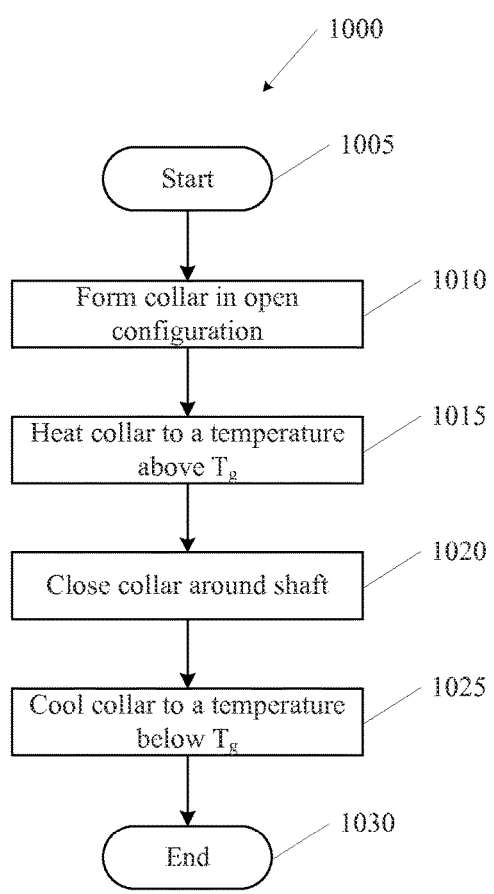
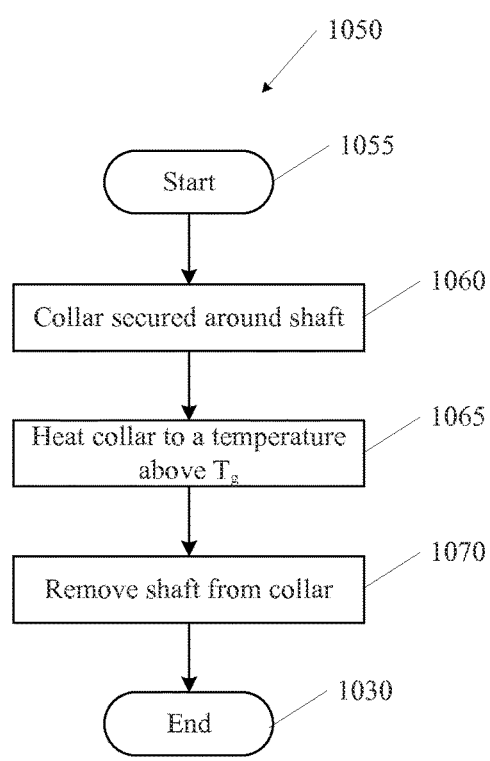
*Figure 10A*   *Figure 10B*

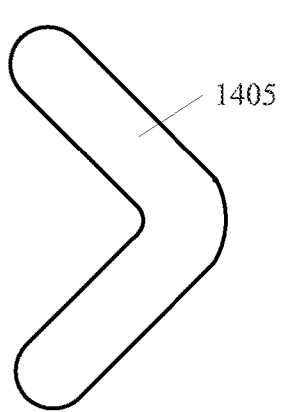
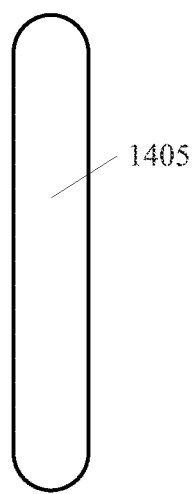
Figure 14A
Figure 14B

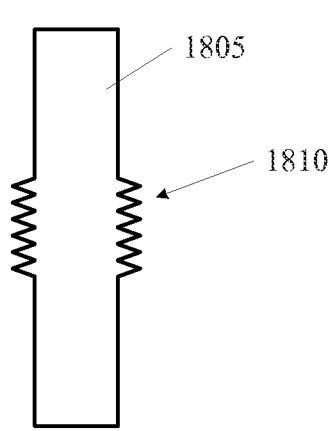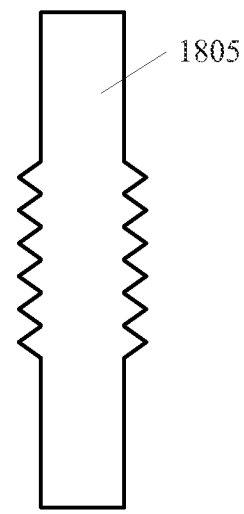
*Figure 18A*     *Figure 18B*

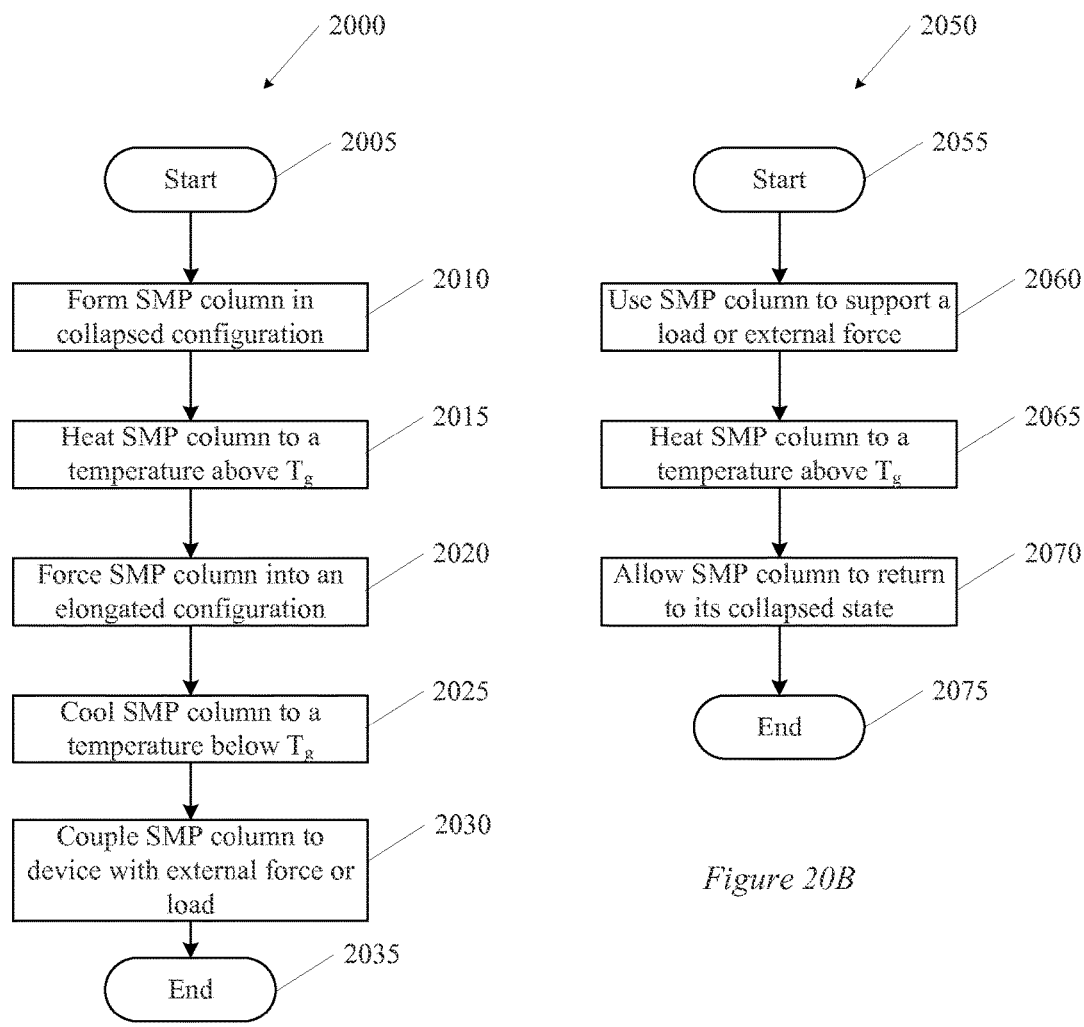

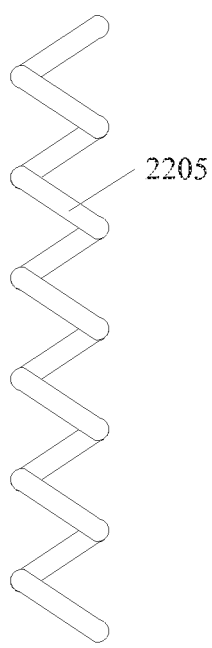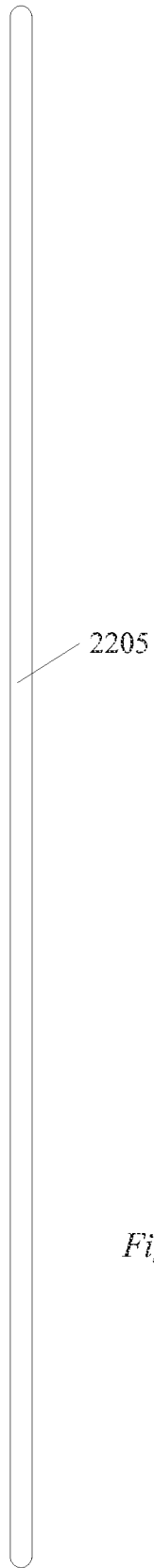
*Figure 22A*
*Figure 22B*

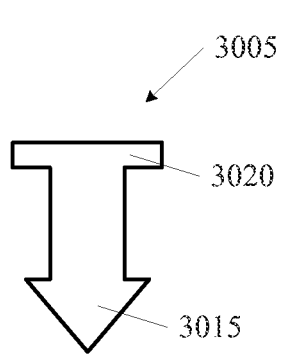
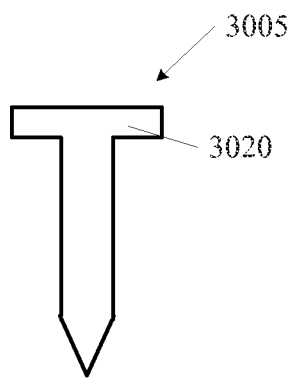
Figure 30A                Figure 30B
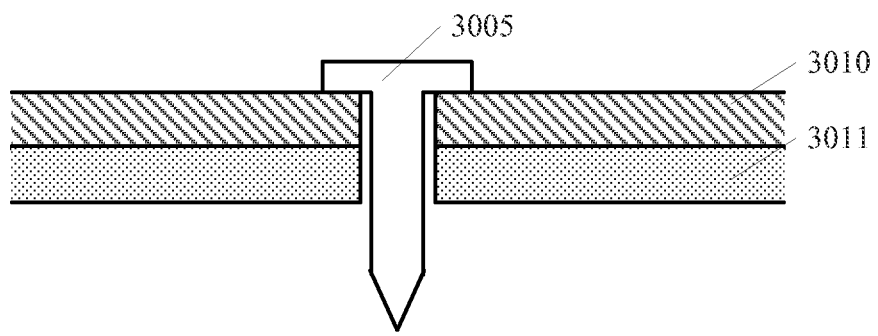
Figure 30C
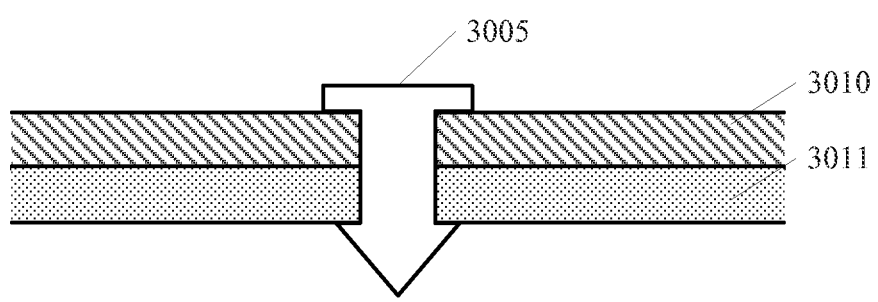
Figure 30D

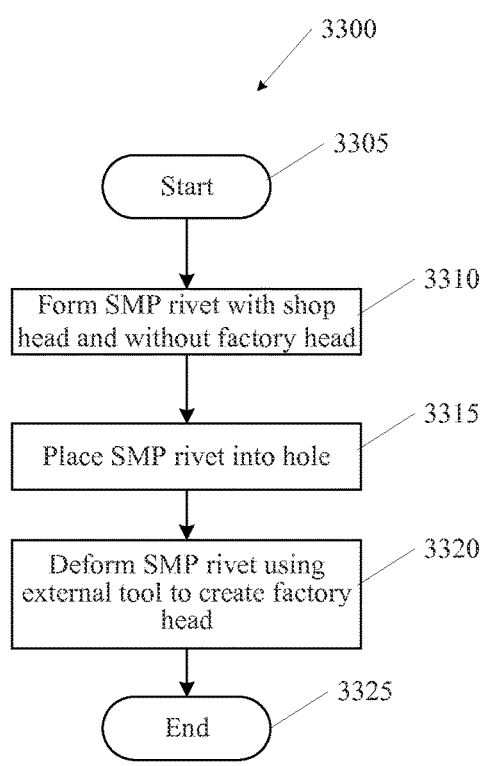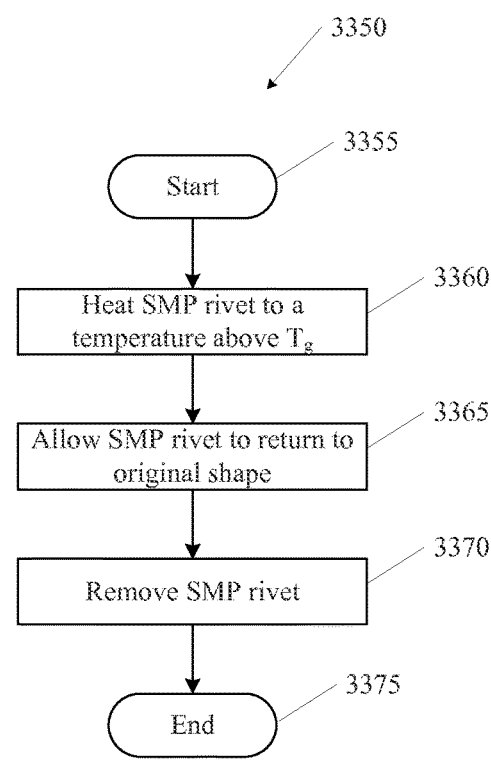
*Figure 33A*
*Figure 33B*

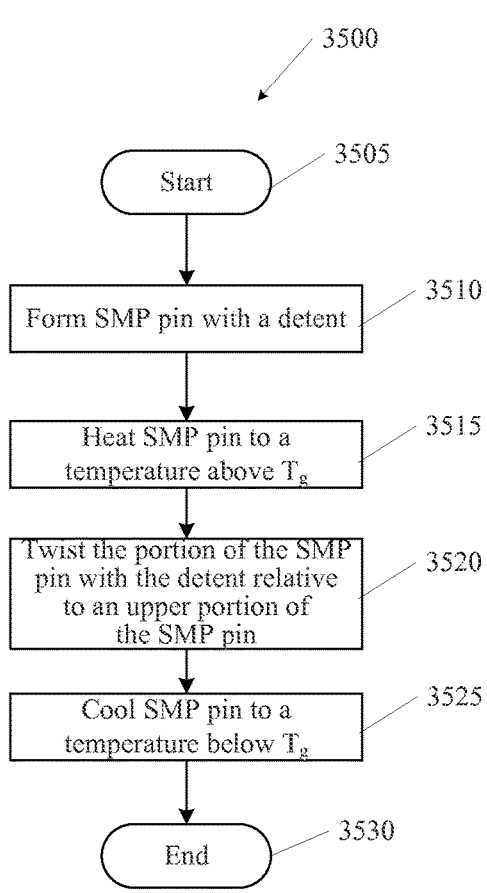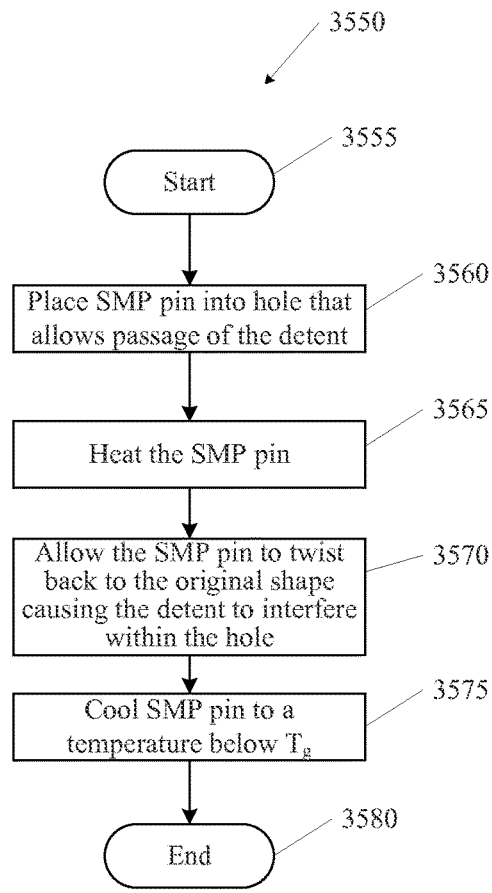
Figure 35A
Figure 35B

SHAPE MEMORY POLYMER DEVICES

BACKGROUND

Shape memory polymer materials are not well known or used. And these materials have only received passing attention in industry. The unique characteristics of these materials have yet to be exploited in meaningful ways.

BRIEF SUMMARY

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

Generally, embodiments of the invention include SMP devices that include two different physical states. One state restricts motion between two distinct objects, and the second state allows relative motion between the two distinct objects. The SMP device can be or be part of one of the two distinct objects. The SMP device changes from one state to another state when heated to temperatures near or above the glass transition temperature (Tg) of the SMP device and/or by application of an external force.

Embodiments of the invention include shape memory polymer (SMP) devices in various configurations. These configurations can include retention devices, bolts, beams, support structures, rivets, screws, collars, retainers, etc. In one embodiment of the invention, an SMP device can be formed in a first shape, heated to temperatures near or above the glass transition temperature of the SMP material, and formed into a second shape. In this shape the SMP device can be used to secure two objects together. This can be done in a number of different ways. Later the SMP device can be heated again to temperatures near or above the glass transition temperature. After being heated the SMP device can return to the first shape either with or without an external force.

In another embodiment of the invention, an SMP structure (or device) can be used in its original shape to offset an external force. The SMP structure, for example, can be a beam, retention device, collar, or pillar, etc. The SMP structure can be heated to temperatures near or above the glass transition temperature. When heated, the SMP structure can change in response to the external force. For example, the SMP device may collapse, open, release, etc.

Various other embodiments of the invention are also disclosed.

BRIEF DESCRIPTION OF THE DRAWINGS

Illustrative embodiments of the present invention are described in detail below with reference to the following drawing figures:

FIGS. 8A and 8B are flowcharts of methods for transforming and using the SMP collar shown in FIG. 7 according to some embodiments of the invention.

FIGS. 10A and 10B are flowcharts of methods for transforming and using the SMP collar shown in FIG. 9 according to some embodiments of the invention.

FIGS. 14A, 14B, 15A, and 15B show an SMP column as fabricated and in use according to some embodiments of the invention.

FIGS. 18A, 18B, 19A, and 19B show another SMP column as fabricated and in use according to some embodiments of the invention.

FIGS. 20A, 20B, and 21 are flowcharts of methods for transforming and using the SMP columns as shown in FIGS. 14, 15, 16, 17, 18, and 19 according to some embodiments of the invention.

FIGS. 22A and 22B show an SMP wire according to some embodiments of the invention.

FIGS. 30A, 30B, 30C and 30D show an SMP rivet as fabricated, transformed under temperature, placed in use, and in use according to some embodiments of the invention.

FIGS. 33A and 33B are flowcharts of methods for transforming and using the SMP bolt shown in FIG. 32 according to some embodiments of the invention.

FIGS. 35A and 35B are flowcharts of methods for creating and using the SMP pin shown in FIG. 34 according to some embodiments of the invention.

DETAILED DESCRIPTION

Figure 1A:
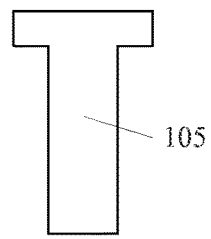
FIGS. 1A, 1B, 1C, 1D, and 1E show an SMP bolt as fabricated, transformed under temperature, in use, and removed after use according to some embodiments of the invention.

Illustrative embodiments of the present invention are described in detail below with reference to the following drawing figures.

Embodiments of the invention include shape memory polymer (SMP) devices that can be used in a number of configurations. Generally, embodiments of the invention include SMP devices that include two different physical states. One state restricts motion between two distinct objects, and the second state allows relative motion between the two distinct objects. The SMP device can be or be part of one of the two distinct objects. The SMP device changes from one state to another state when heated to temperatures near or above the glass transition temperature (Tg) of the SMP device and/or by application of an external force.

As another example, an SMP device can be fabricated in an original shape. The SMP device can be heated to temperatures near or above the glass transition temperature of the SMP material and then changed into a second shape; for example, with an external force. This external force can be any type of force; for example, a torsion force, a tensile force, a compression force, etc. The SMP device can then be placed in use in the second shape. For example, in the second shape the SMP device can be used to secure two devices together, to support a load, to prevent relative motion, to allow relative motion, to twist a device, to be used as an attachment mechanism, etc. The SMP device can then be heated to temperatures near or above the glass transition temperature and the SMP device can begin to change its shape back in the original shape. In some cases, an external force can be used to assist the SMP device in changing its shape back to the original shape. Once in the original shape or close thereto, in some cases, an action can occur; for example, two devices may no longer be secured together or a load may no longer be supported. Various embodiments of the invention incorporate this example.

As another example, an SMP device can be fabricated in an original shape. While in the original shape, the SMP device can be used to resist a load, provide support, attach two devices, etc. For example, in the second shape the SMP device can be used to resist a force or to support a load. The SMP device can then be heated to temperatures near or above the glass transition temperature of the SMP material. At this point the SMP device is still in its original shape so it will not change back into the original shape. But when heated to temperatures near or above the glass transition temperature and when either resisting a force or supporting a load, the SMP device will change shape; for example, the SMP device will buckle, morph, open, etc. Various embodiments of the invention incorporate this example.

Embodiments of the invention exploit the unique properties of SMP materials. One such property allows SMP materials to elicit shape memory properties. For instance, SMP materials can be formed in an original state. When they are heated to temperatures near or above the glass transition temperature of the SMP material, the phase can change to a rubber phase (or become pliable or shapeable) and the shape can be changed into a second shape by applying an external force. Upon cooling to a temperature below the glass transition temperature, the shape of the SMP material will remain in the second shape. If the SMP material is heated again to temperatures near or above the glass transition temperature, the SMP material will naturally change back to the original shape unless acted upon by an external load or force that restricts such changes. Typically, an SMP material can return to a shape that is substantially similar to the original shape. As used herein, a shape that is substantially similar to another shape has roughly the same general shape although not perfectly similar.

But in some cases, an SMP material may not return completely to its original shape. That is, in some cases, a shape memory material may not return completely to its original shape after being heated to temperatures near or above the glass transition temperature. This effect may be exacerbated by age, the number of times the SMP material is heated to temperatures near or above the glass transition temperature, mechanical distress, extreme environments, etc. Therefore, a shape is substantially similar to another shape if the variation in shape varies less than 15% between the two.

SMP materials can include various thermoset, thermoplastic, or epoxy polymers. SMP materials may also include either a closed or open cell foam material. SMP materials may include a polymer foam with a glass transition temperature lower than the survival temperature of the material. For example, SMP materials may comprise TEMBO® shape memory polymers, TEMBO® foams or Elastic Memory Composites, which consist of a composite between reinforcing materials and TEMBO® shape memory polymers, or combinations of the above.

The glass transition temperature of a given SMP material can be modified by modifying the mixture of materials in the SMP material. In this way, SMP devices with specific glass transition temperatures can be created for specific applications.

One example of an SMP material that can be used in the various embodiments of the invention is TEMBO® available from Composite Technology Development in Lafayette, Colo.

Generally speaking, the glass transition temperature, Tg, is the reversible transition in materials from a hard (or non-pliable) state into a rubber-like state. The glass transition temperature is unique to specific materials and can be unique to different types or species for SMP materials. Different operational definitions for the glass transition temperature are in use in the art. Several of these are endorsed as accepted scientific standards. Many definitions are arbitrary and yield different numeric results. At best, the various values of glass transition temperature for a given substance typically agree within a few Kelvins. Embodiments of the invention are applicable regardless of the definition of the glass transition temperature used.

There are a number of ways to heat a SMP material or device to a temperature near or above the glass transition temperature. For example, SMP materials can be heated with convective heating using, for example, hot air guns, an oven, etc. As another example, SMP materials can be heated with radiation from a light source that applies, for example, IR or UV light. As another example, SMP materials can be heated with resistive heating elements that are embedded or coupled with the SMP material. Resistive heaters can include, for example, resistive wire heaters. As another example, SMP materials can be heated with Inductive or RF heat sources. Any other type of heat source can also be used.

A number of examples of SMP devices are described below.

SMP Bolts

Figure 1B:
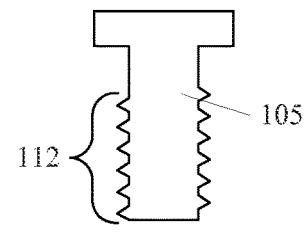

FIGS. 1A, 1B, 1C, 1D, and 1E show SMP bolt 105 as fabricated, transformed under temperature, in use, and removed after use according to some embodiments of the invention. FIG. 1A shows SMP Bolt 105 in the original shape. SMP bolt 105 can be made partially or completely from SMP material(s). This shape does not include threads or tabs. SMP bolt 105 can be heated to temperatures near or above the glass transition temperature of the SMP material and transformed into a second shape with an external force; for example, a compressive force that compresses SMP Bolt into the second shape. FIG. 1B shows SMP bolt 105 having this second shape after cooling below the glass transition temperature. This shape can include a plurality of threads 112.

Figure 1C:
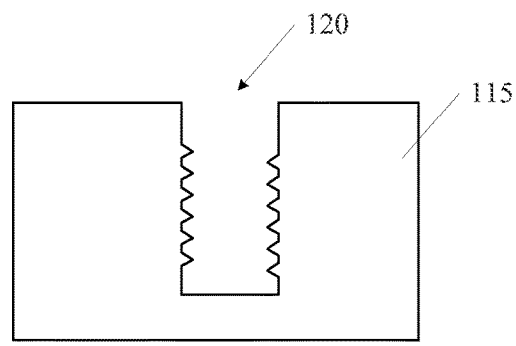
Figure 1D:
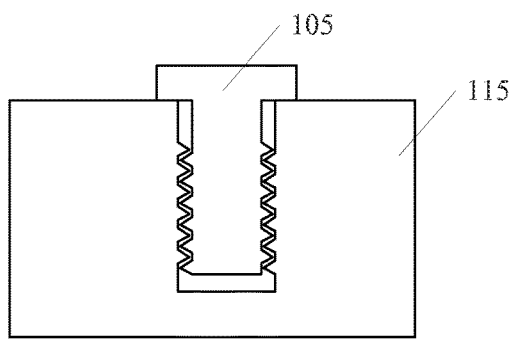

In use, SMP bolt 105 can be threaded into threaded socket 120 within structure 115 as shown in FIG. 1C. Structure 115, for example, can be a nut. As another example, structure 115 can include two or more structures that require SMP bolt 105 to secure or fasten the structures together. FIG. 1D shows SMP bolt 105 secured within threaded socket 120. SMP bolt 105 can be threaded into threaded socket 120 using standard techniques. SMP bolt 105 can then be used in this state for any period of time.

Figure 1E:
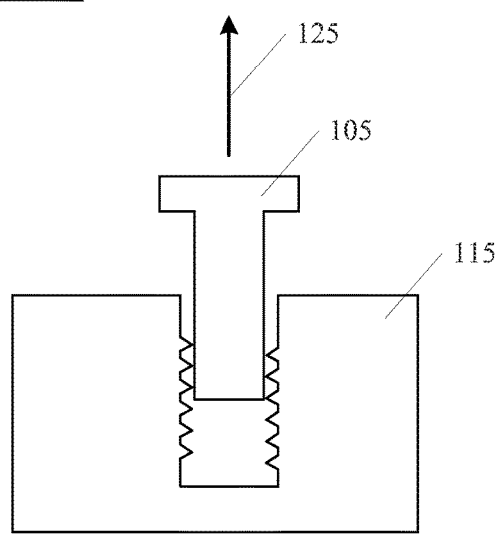

FIG. 1E shows SMP bolt 105 after SMP bolt 105 has been heated to temperatures near or above the glass transition temperature of the SMP material. SMP bolt 105 can also be subject to external force 125, which acts to pull SMP bolt 105 from threaded socket 120. In some embodiments, external force 125 can be applied at the same time as SMP bolt 105 is subject to temperatures near or above the glass transition temperature. The combination of heating SMP bolt 105 to temperatures near or above the glass transition temperature of the SMP materials, applying external force 125, and SMP bolt 105's mechanical contact with threads in socket 120 can force SMP bolt 105 back to the original shape or to a shape substantially close to the original shape shown in FIG. 1A.

External force 125 can include a tool that is not integral with SMP bolt 105. This tool can apply a compression force or tensile force to SMP bolt 105. For example, external force 125 can be applied by a hand tool, by hand, with a vibration table, etc. In some cases external force 125 can be applied by a separate elastic element within the system. A separate elastic element may or may not be directly coupled to the SMP device. It can be permanent within the overall system. For example, an elastic element could be an extensional spring located next to an SMP device. A hybrid structure can include an SMP structure and an elastic element (like a spring) that are combined in the same device.

In other embodiments, external force 125 can be applied after SMP bolt 105 is subject to temperatures near or above the glass transition temperature. In such embodiments, SMP bolt 105 can transition to the original shape or a shape substantially close to the original shape (e.g., as shown in FIG. 1A) under temperatures near or above the glass transition temperature without aide of external force 125. Once SMP bolt 105 has transitioned to the original shape, external force 125 can be applied to extract SMP bolt 105 from threaded socket 120.

Figures 2A, 2B:
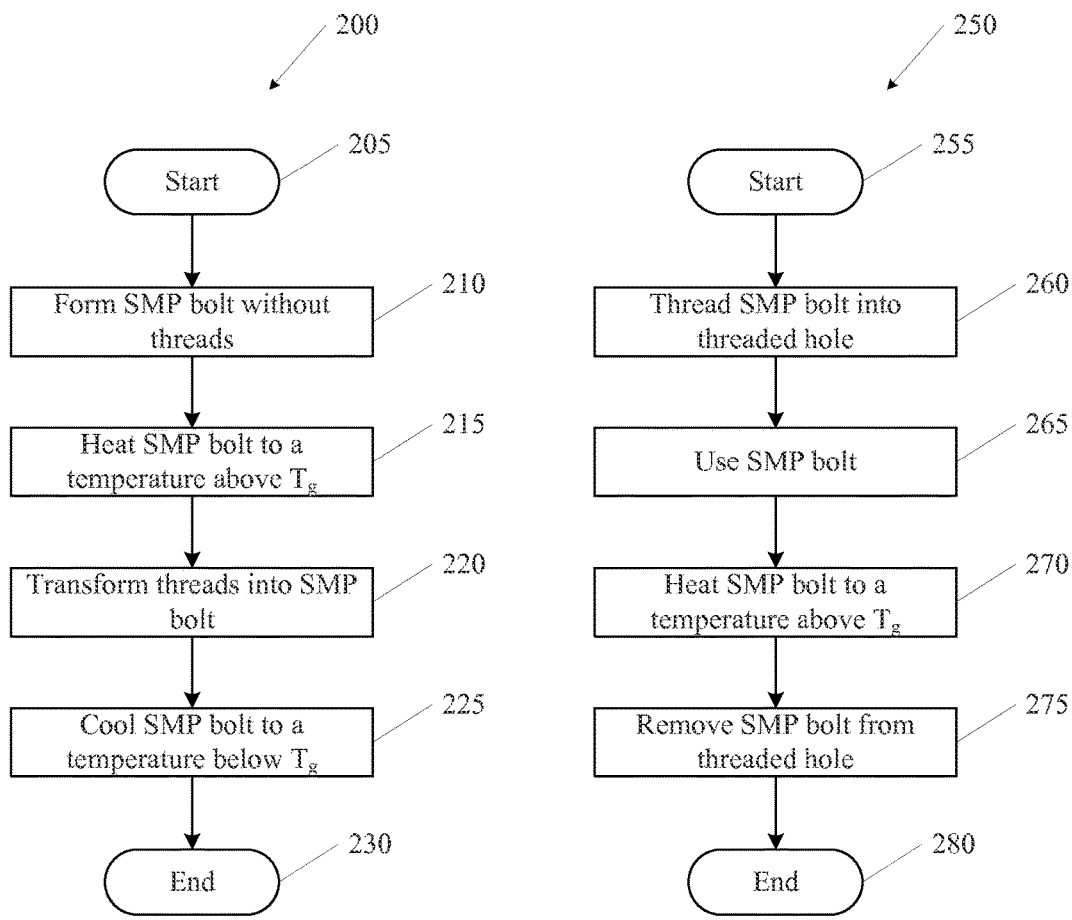
FIGS. 2A and 2B are flowcharts of methods for transforming and using the SMP bolt shown in FIG. 1 according to some embodiments of the invention.

FIGS. 2A and 2B are flowcharts of processes 200 and 250 for transforming and using the SMP bolt shown in FIG. 1 according to some embodiments of the invention. Process 200 starts at block 205. At block 210 an SMP bolt (e.g., SMP bolt 105 shown in FIG. 1A) is formed in its original state without threads. At block 215 the SMP bolt is heated to temperatures near or above the glass transition temperature of the SMP material. At block 220 threads are transformed into the SMP bolt using any technique known in the art, such as, extrusion, transforming, etc. At block 225 the SMP bolt is cooled to a temperature below the glass transition temperature of the SMP material. At block 230 process 200 ends. After the SMP bolt is fabricated as described in process 200, the SMP bolt can be used for any fastening application.

Process 250 begins at block 255. At block 260 an SMP bolt can be threaded into any threaded socket and used in application at block 265. At some point it may be desirable to remove the SMP bolt. At block 270 the SMP bolt can be heated to temperatures near or above the glass transition temperature of the SMP material for a period of time. This period of time, for example, may need to be long enough to allow the SMP bolt to return to the original shape or a shape substantially near to the original shape. At block 275 the SMP bolt can be removed under an external force. Blocks 270 and 275 can occur at the same time or at different times. Process 250 ends at block 280.

A SMP bolt can be used, for example, in various applications where bolt removal is required after use. A plurality of SMP bolts can be used as fasteners in an apparatus, for example, to join two materials together. At some point it may be desirable to remove the two devices from being joined together. The apparatus can simply be heated to temperatures near or above the glass transition temperature of the SMP material and then SMP bolts 105 can be removed. This can be done, for example, by placing the apparatus in an oven for a period of time sufficient for SMP bolts 105 to return to the original shape. After or at the same time as the heating, for example, the apparatus can be vibrated to remove SMP bolts 105.

In one application, SMP bolts can be used to secure various components within an automobile, such as securing door panels, dashboards, fabrics, etc. to the metallic frame.

SMP bolts 105 would be ideal for such applications because of their low weight. At some point when the automobile is being recycled, for example, the automobile can be placed in a large oven, heated to temperatures near or above the glass transition temperature, and vibrated to release the various components secured to the metallic frame.

Figure 3A:
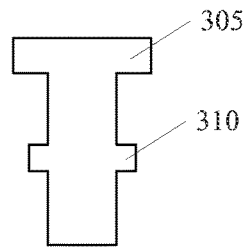
FIGS. 3A, 3B, 3C, 3D, 3E, and 3F show an SMP bolt with tabs as fabricated, transformed under temperature, in use, and removed after use according to some embodiments of the invention.
Figure 3B:
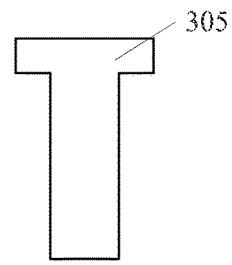
Figure 3C:
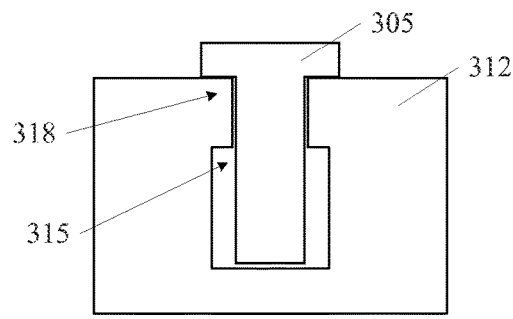
Figure 3D:
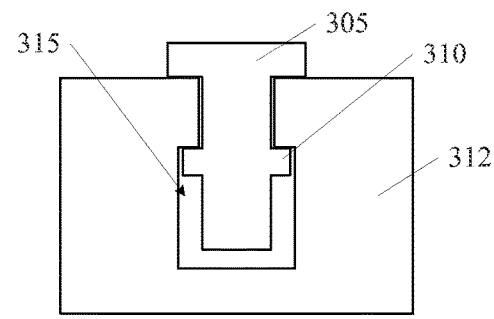

FIGS. 3A, 3B, 3C, 3D, 3E, and 3F show SMP bolt 305 with tabs 310 as fabricated, transformed under temperature, in use, and removed after use according to some embodiments of the invention. SMP bolt 305 can be fabricated with tabs 310 as shown in FIG. 3A. SMP bolt 305 can be fabricated from SMP material(s). SMP bolt 305 can then be heated to temperatures near or above the glass transition temperature of the SMP material and formed into a second shape without tabs 310 as shown in FIG. 3B. This change from the original shape to the second shape can occur under an external force and various processes can be used to transform SMP bolt 305 into another shape. SMP bolt 305 can then be placed within tabbed socket 315 of apparatus 312 as shown in FIG. 3C. Once placed within apparatus 312, SMP bolt 305 can be heated to temperatures near or above the glass transition temperature of the SMP material and SMP bolt 305 can return to its original shape with a tab or tabs 310 as shown in FIG. 3D.

Figure 3E:
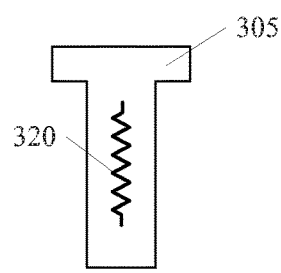

In some embodiments, SMP bolt 305 can return to its original shape without an external force. In other embodiments, SMP bolt 305 can return to its original shape with an external force. For example, as shown in FIG. 3E SMP bolt 305 can include internal spring 320. Internal spring 320 can provide a force that can aid in changing SMP bolt 305 from the second shape to the original shape. In order to change SMP bolt 305 from the original shape to the second shape (that is going from the shape shown in FIG. 3A to the shape shown in FIG. 3B) a force greater than the force applied by internal spring 320 must be applied. Internal spring 320 can provide a large enough force to transform SMP bolt 305 into another state when within the rubber phase but not large enough to transform SMP bolt 305 when in the solid phase. Spring 320 can apply either a compression or a tensile force to SMP bolt 305.

Figure 3F:
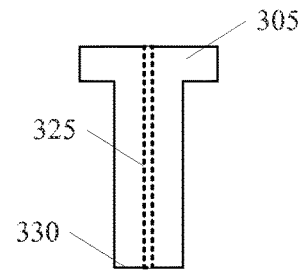

FIG. 3F shows SMP bolt 305 with internal channel 325. Internal channel 325 can be used by a tool or other mechanical device to aid in forcing SMP bolt 305 to transition from the second shape to the original shape. For example, the tool may have a mandrel that can extend through internal channel 325 and engage bottom end 330 of SMP bolt 305. When SMP bolt 305 is heated to temperatures near or above the glass transition temperature of the SMP material, the mandrel extends through internal channel 325 and engages with bottom 330 of SMP bolt 305. Once engaged the tool can apply a force (e.g., compression or tensile force) on SMP bolt 305 to aid in transitions between the original shape and the second shape. Various other tools and/or tooling devices can be used. And various other modifications on SMP bolt 305 can be used to accommodate and/or assist with a tool that works with SMP bolt 305.

Figures 4A, 4B:
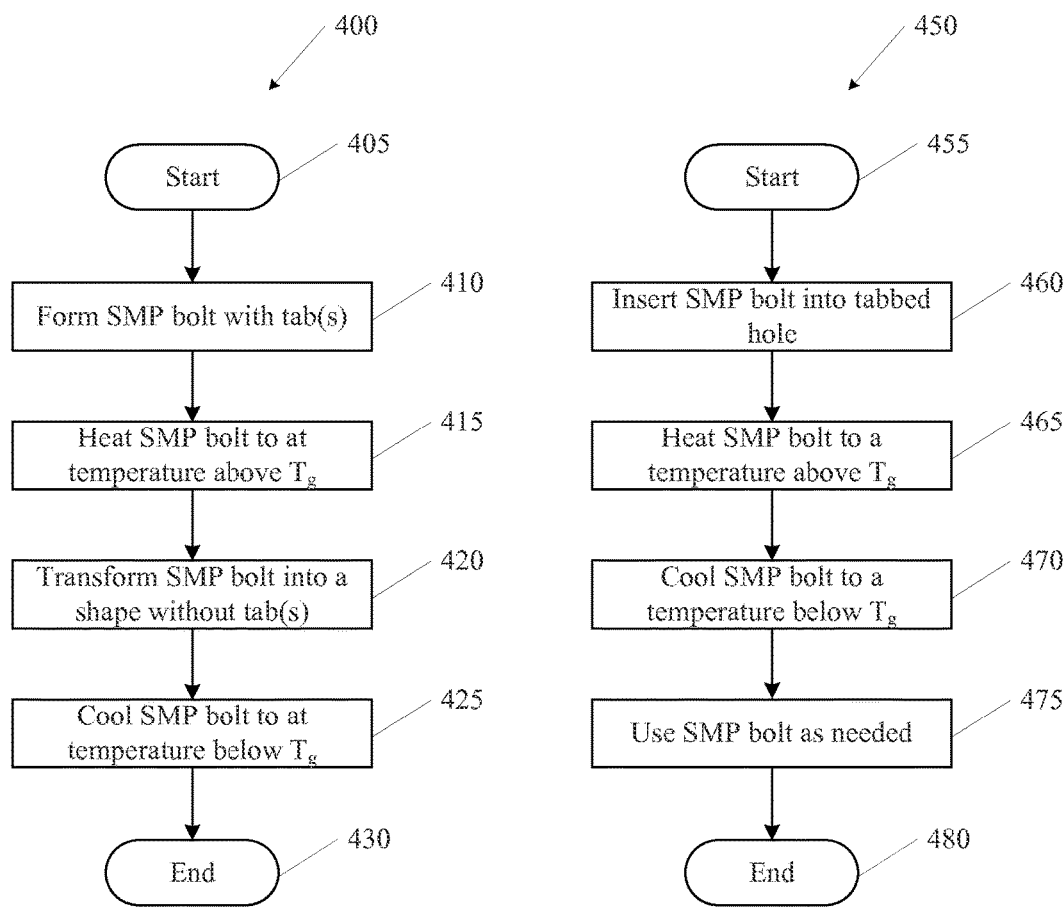
FIGS. 4A and 4B are flowcharts of methods for transforming and using the SMP bolt with tabs shown in FIG. 3 according to some embodiments of the invention.

FIGS. 4A and 4B are flowcharts of processes 400 and 450 for transforming and using SMP bolt 305 with tabs shown in FIG. 3 according to some embodiments of the invention. Process 400 starts at block 405. At block 410 an SMP bolt is formed in its original state with tab 310. At block 415 the SMP bolt is heated to temperatures near or above the glass transition temperature of the SMP material. At block 420 tabs 310 are removed from the SMP bolt. Tab or tabs can be removed using any technique, such as extrusion, transforming, stretching, etc. At block 425 the SMP bolt is cooled to a temperature below the glass transition temperature of the SMP material. At block 430 process 400 ends.

After the SMP bolt is fabricated as described in process 400, the SMP bolt can be used for any fastening application. Process 450 begins at block 455. At block 460 SMP bolt can be inserted into a tabbed socket. After insertion, the SMP bolt can be heated to temperatures near or above the glass transition temperature of the SMP material at block 465 and the SMP bolt can revert back to its original shape with tabs 310. As noted above, various tools or springs can be used to assist in restoring the SMP bolt to the original shape. At this point the tabs can secure the SMP bolt within the tabbed socket by inner tabs. The SMP bolt can then be cooled to a temperature below the glass transition temperature of the SMP material at block 470 and the bolt can be used as needed at block 475. Process 450 can then end at block 480.

Figure 5A:
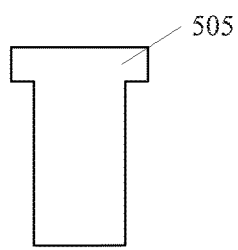
FIGS. 5A, 5B, 5C and 5D show an SMP bolt as fabricated, transformed under temperature, in use, and removed after use according to some embodiments of the invention.
Figure 5B:
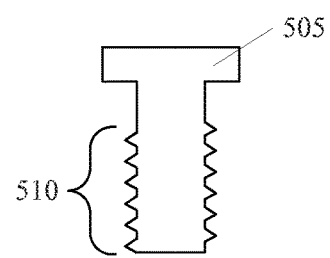
Figure 5C:
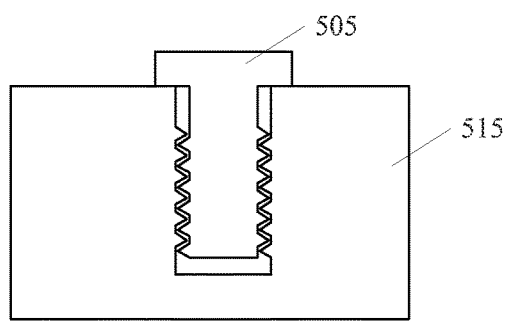
Figure 5D:
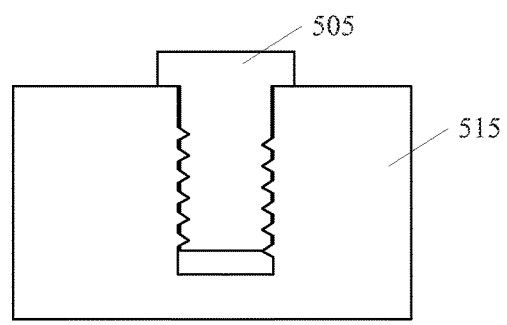

FIGS. 5A, 5B, 5C and 5D show SMP bolt 505 as fabricated, transformed under temperature, in use, and removed after use according to some embodiments of the invention. SMP bolt 505 can be transformed into another shape without tabs or threads as shown in FIG. 5A and can be fabricated from SMP material. SMP bolt 505 can be fabricated with a diameter greater than the diameter of SMP bolt 510. As shown in FIG. 5B, threads can be added to SMP bolt 505 and/or the diameter of the bolt can be narrowed. This can be done when the SMP bolt 505 is heated to temperatures near or above the glass transition temperature of the SMP material. For example, threads 510 can be transformed into SMP bolt 505 by extrusion, a mold, etc. In FIG. 5C, SMP bolt 505 can be threaded into a corresponding nut, socket, or hole with the corresponding threads in apparatus 515. SMP bolt 505 can then be reheated to temperatures near or above the glass transition temperature of the SMP material. SMP bolt 505 can then try to return to its original shape. By returning to its original shape, SMP bolt 505 can be held more securely within apparatus 515 as shown in FIG. 5D.

Figure 6:
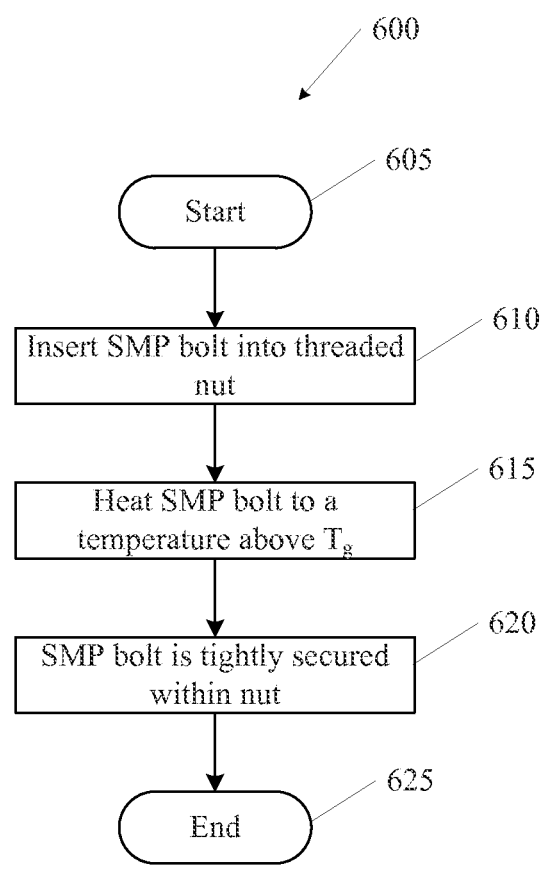
FIG. 6 is a flowchart of a method for using the SMP bolt shown in FIG. 5 according to some embodiments of the invention.

FIG. 6 is a flowchart of process 600 for using an SMP bolt like, for example, the SMP bolt shown in FIG. 5 according to some embodiments of the invention. Process 600 begins at block 605. At block 610 an SMP bolt is inserted into a threaded nut or bolt. At block 615 the SMP bolt is heated to temperatures near or above the glass transition temperature of the SMP material. As noted above, when heated to temperatures near or above the glass transition temperature of the SMP material the SMP bolt will morph into its original shape or to a shape substantially similar to the original shape. At block 620 the SMP bolt can become tightly secured within the threaded socket and/or nut. At block 625 process 600 can end.

Various other SMP bolts with or without threads and/or with or without tabs can be designed similar to the SMP bolts described above regardless of dimensionality, composition, etc.

SMP Collars

Figure 7A:
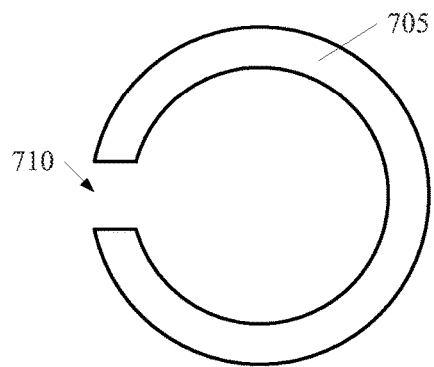
FIGS. 7A, 7B, 7C and 7D show an SMP collar as fabricated, transformed under temperature, and in use with a shaft according to some embodiments of the invention.

FIGS. 7A, 7B, 7C and 7D show SMP collar 705 as fabricated, transformed under temperature, and in use with a shaft according to some embodiments of the invention. FIG. 7A shows SMP collar 705 fabricated in a circular shape. This circular shape can be the original shape of SMP collar 705. SMP collar 705 may or may not include gap 710, which can vary in size. SMP collar 705 can be made with any width, thickness and/or radius.

Figure 7B:
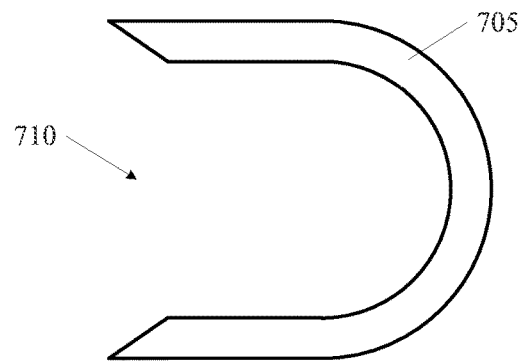
Figure 7C:
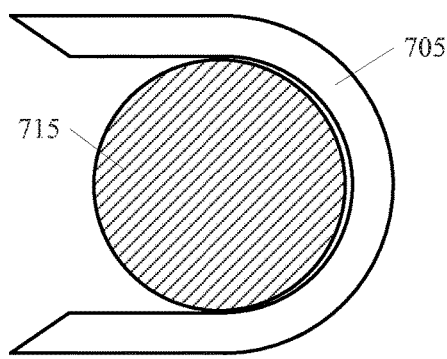
Figure 7D:
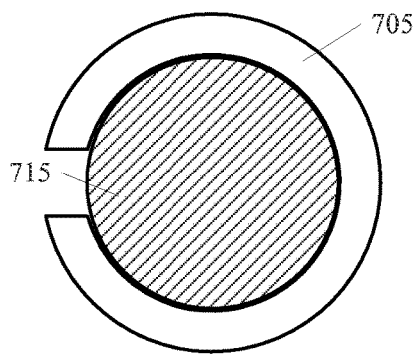

SMP collar 705 can be heated to temperatures near or above the glass transition temperature of the SMP material and opened such that gap 710 is much larger as shown in FIG. 7B. Gap 710 can be opened wide enough or wider in order to allow shaft 715 to slide within SMP collar 705 as shown in FIG. 7C. SMP collar 705 can then be heated to temperatures near or above the glass transition temperature of the SMP material and reformed into the original shape around shaft 715 as shown in FIG. 7D. SMP collar 705 can be manually reformed into the original shape using various types of tools or equipment. SMP collar 705 can also be reformed into the original shape solely by the shape memory characteristics of the SMP material.

While SMP collar 705 is shown with a circular or c-shape, SMP collars can have any shape. For example, SMP collars can be oval, square, rectangular, etc.

FIGS. 8A and 8B are flowcharts of process 800 and 850 for transforming and using an SMP collar such as the one shown in FIG. 7 according to some embodiments of the invention. Process 800 starts at block 805. At block 810 the SMP collar is formed in an original shape, for example, that is circular or C-shape. The SMP collar can then be heated to temperatures near or above the glass transition temperature of the SMP material at block 815. The SMP collar can then be opened at block 820. This opening can be done manually using any number of standard or custom tools. At block 825 the SMP collar is cooled back to a temperature below the glass transition temperature (e.g., room temperature). The SMP collar is then fixed in this open configuration. Process 800 can then end at block 830.

FIG. 8B shows process 850 that starts at block 855. At block 860 the SMP collar is slid into position around a shaft (e.g., shaft 715) at block 860. At block 865 the SMP collar is heated to temperatures near or above the glass transition temperature of the SMP material at block 865. The SMP collar can then return to its original shape at block 870. The SMP collar can naturally return to the original shape or the SMP collar may be forced to return to its original shape. At block 865, the SMP collar is cooled to a temperature below the glass transition temperature of the SMP material and SMP collar can return to its original shape. Process 850 can end at block 880 with SMP collar secured around the shaft.

SMP collar 705 can be used in various assemblies. The shape memory performance of SMP collar 705 can securely fit around shaft 715 because SMP collar 705 shrinks after being subject to temperatures near or above the glass transition temperature. In some embodiments, the inner radius of SMP collar 705 in the original shape can be smaller than the radius of shaft 715. In this way, when raised to temperatures near or above the glass transition temperature of the SMP material, SMP collar 705 is snugly coupled around with shaft 715.

Figure 9A:
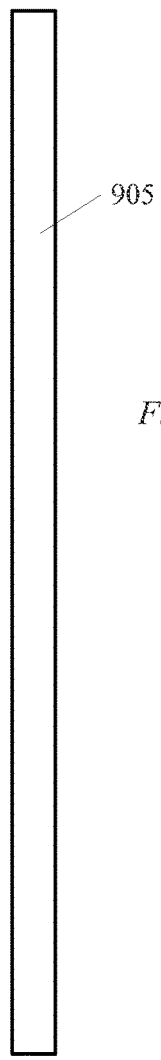
FIGS. 9A, 9B, and 9C show an SMP collar as fabricated, transformed under temperature, and in use with a shaft according to some embodiments of the invention.
Figure 9B:
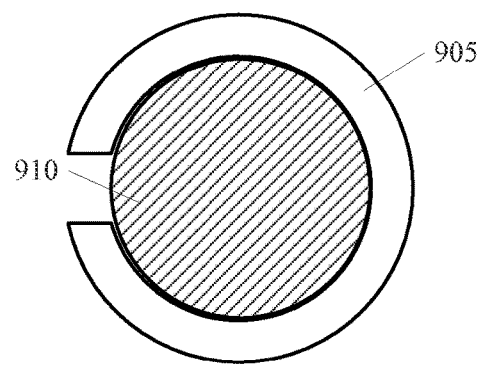
Figure 9C:
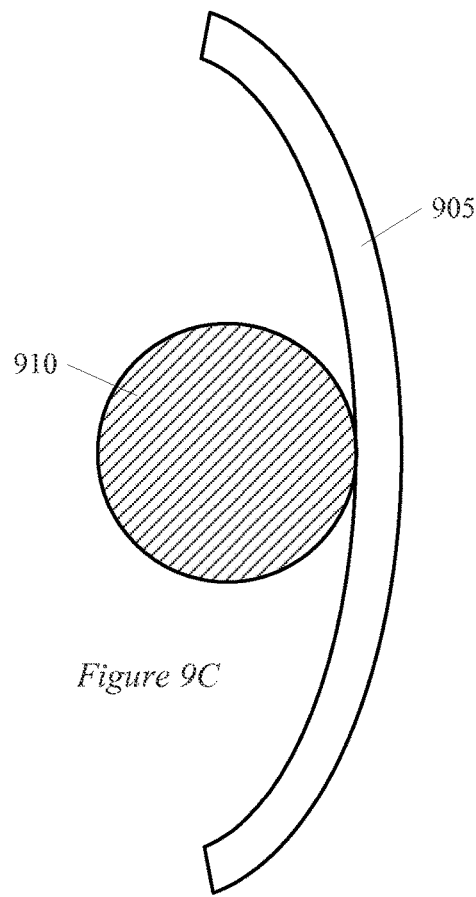

FIGS. 9A, 9B, and 9C show SMP collar as fabricated, transformed under temperature, and in use with a shaft according to some embodiments of the invention. FIG. 9A shows SMP collar 905 fabricated in a straight or nearly straight configuration. SMP collar 905 can be heated to temperatures near or above the glass transition temperature of the SMP material and molded around shaft 910 as shown in FIG. 9B. The temperature of SMP collar 905 can then be lowered to a temperature below the glass transition temperature and SMP collar 905 can perform its function on shaft 910.

At some later point it may be desirable to remove SMP collar 905 from shaft 910. SMP collar 905 can be heated to temperatures near or above the glass transition temperature, causing SMP collar to return to its original shape (i.e., the shape shown in FIG. 9A). This can be helpful for, among other things, releasing shaft 910 from SMP collar 905. In some embodiments, a force can be applied on shaft 910. When SMP collar 905 is heated, the combination of the heat and the force can cause SMP collar 905 to open. Various other benefits can be realized.

FIGS. 10A and 10B are flowcharts of processes 1000 and 1050 for transforming and using the SMP collar shown in FIG. 9 according to some embodiments of the invention. Process 1000 shown in FIG. 10A starts at block 1005. At block 1010 an SMP collar (e.g., SMP collar 905) can be formed in the open configuration. For example, the SMP collar can be formed straight or nearly straight (e.g., see FIG. 9A). At block 1015 the SMP collar is heated to temperatures near or above the glass transition temperature of the SMP material and the SMP collar is formed around a shaft at block 1020 (e.g., see FIG. 9B). At block 1025 the SMP collar is cooled to a temperature below the glass transition temperature of the SMP material while the SMP collar is secured around the shaft. Process 1000 can then end at block 1030.

Process 1050, shown in FIG. 10B, starts at block 1055. At block 1060 an SMP collar is in use while secured around a shaft (e.g., see FIG. 9B). The SMP collar can be in use for any period of time. At some point removal of the SMP collar may be desired. At block 1065 the SMP collar can be heated to temperatures near or above the glass transition temperature of the SMP material. At some point during this heating process the SMP collar may open because of its shape memory properties and/or the SMP collar is forced open by an outside force. Regardless, the shaft is removed from the SMP collar. At block 1030 process 1050 can end.

SMP Retention Devices

Figure 11A:
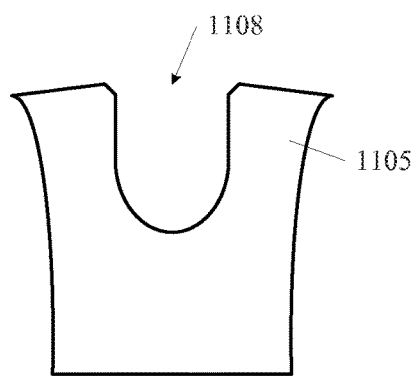
FIGS. 11A, 11B, 11C, and 11D show an SMP retainer as fabricated, transformed under temperature, and in use with a shaft according to some embodiments of the invention.
Figure 11B:
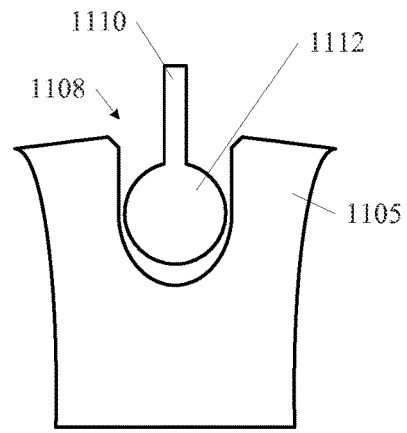

FIGS. 11A, 11B, 11C, and 11D show SMP retention device 1105 as fabricated, transformed under temperature, and in use with a shaft according to some embodiments of the invention. FIG. 11A shows SMP retention device 1105 as fabricated in its original shape. SMP retention device can include pocket 1108. In FIG. 11B shaft 1110 is placed within pocket 1108. While shaft 1110 is shown with ball 1112, any type of shaft with an enlarged head may be used. Any shape may be used; for example, a shaft with a cube, cylinder, pyramid, cone, etc.

Figure 11C:
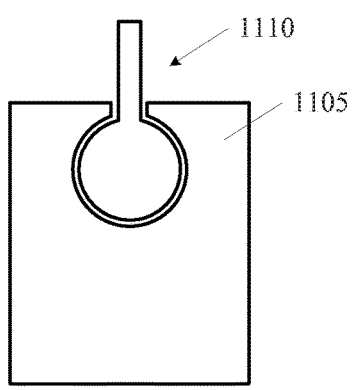
Figure 11D:
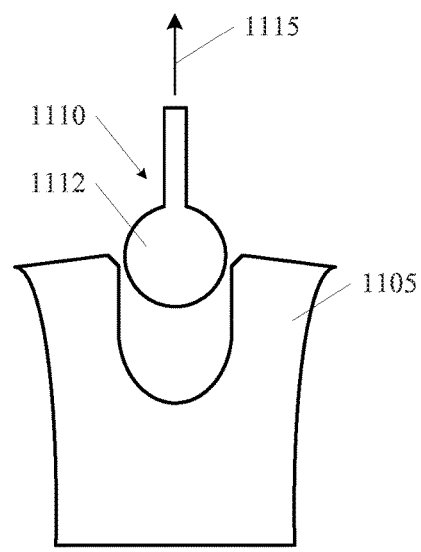

SMP retention device 1105 can then be heated to temperatures near or above the glass transition temperature of the SMP material, after which, as shown in FIG. 11C, SMP retention device 1105 can be formed in a closed configuration. In the closed configuration, ball 1112 is secured within SMP retention device 1105 by closing pocket 1108 around ball 1112. In this way retention device 1105 can retain ball 1112 and shaft 1110 in place. SMP retention device 1105 can then be cooled to a temperature below the glass transition temperature of the SMP material of the SMP retention device 1105. FIG. 11D shows SMP retention device 1105 after being heated to temperatures near or above the glass transition temperature of the SMP material. When heated SMP retention device 1105 may return to the original shape and shaft 1110 may be released. SMP retention device 1105 may return to its original shape with or without the aide of an outside force. In some embodiments, a force applied to shaft 1110 when SMP retention device 1105 is to temperatures near or above the glass transition temperature can aide in opening pocket 1108 and allowing ball 1112 to release.

Figure 12A:
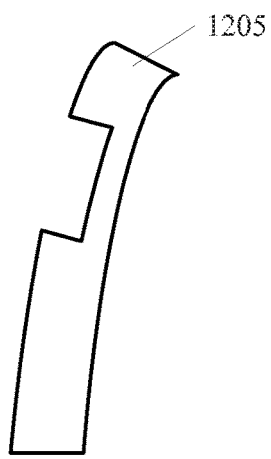
FIGS. 12A, 12B, 12C, and 12D show another SMP retainer as fabricated, transformed under temperature, and in use with a shaft according to some embodiments of the invention.
Figure 12B:
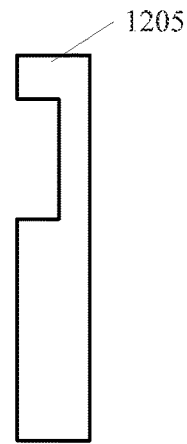
Figure 12C:
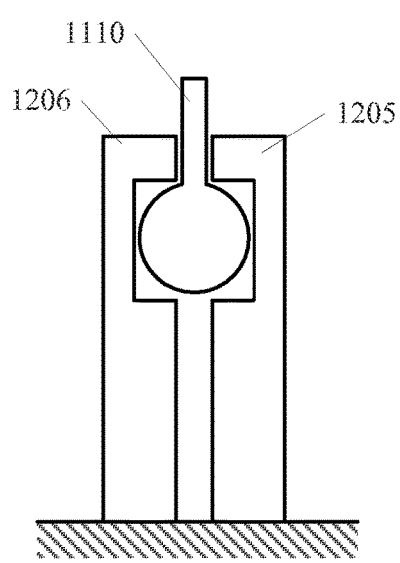
Figure 12D:
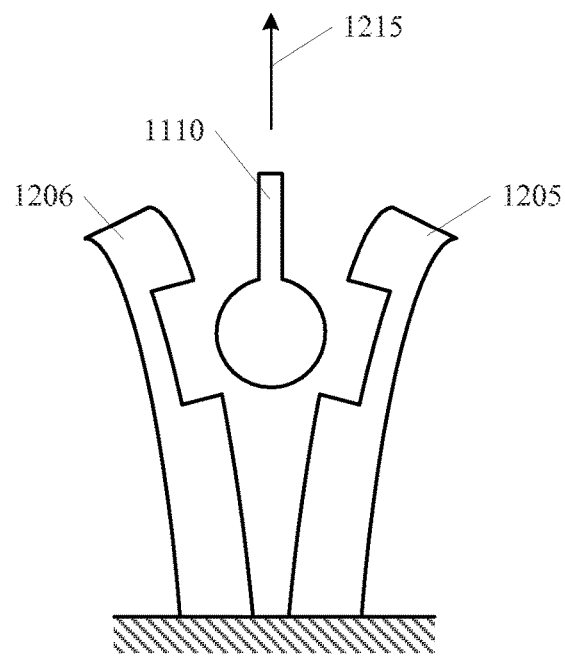

FIGS. 12A, 12B, 12C, and 12D show a two-sided SMP retention device 1205 as fabricated, transformed under temperature, and in use with a shaft according to some embodiments of the invention. FIG. 12A shows single SMP retention device 1205 as fabricated in the release state. FIG. 12B shows single SMP retention device 1205 in the retention state. The storage state can be created by heating SMP retention device 1205 and transforming it from the release state to the retention state. FIG. 12C shows two single SMP retention devices 1205 securing shaft 1110 between the two SMP retention devices 1205. FIG. 12D shows the two SMP retention devices 1205 after being heated to temperatures near or above the glass transition temperature of the SMP material. Both retention devices can return to the release state or close thereto. Force 1215 on shaft 1110 can aid in opening the two SMP retention devices and partially forcing them into the release state.

Figures 13A, 13B:
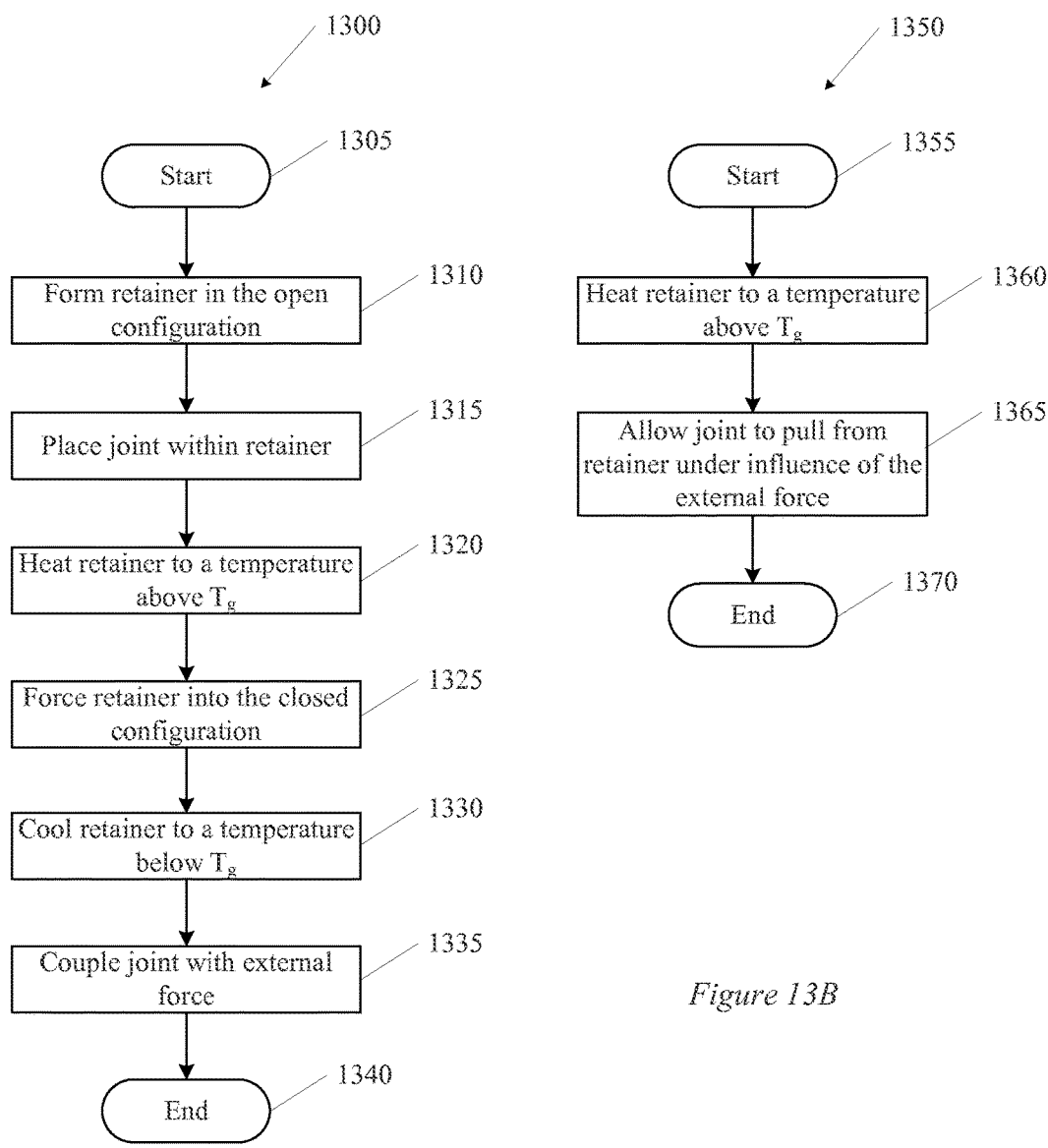
FIGS. 13A and 13B are flowcharts of methods for transforming and using the SMP retention devices shown in FIGS. 11 and 12 according to some embodiments of the invention.

FIGS. 13A and 13B are flowcharts of processes 1300 and 1350 for transforming and using the retention devices shown in FIGS. 11 and 12 according to some embodiments of the invention. Process 1300 as shown in FIG. 13A begins at block 1305. At block 1310 a retention device is formed in the open configuration from SMP materials. Some type of joint can be created within the SMP material in block 1315. This joint can be formed by joining two separate SMP materials or within a single SMP material. At block 1320 the retention device is heated to temperatures near or above the glass transition temperature of the SMP material. At block 1325 the retention device is forced into the storage state. The retention device can secure a ball shaft when in the storage state.

At block 1330 the SMP device is cooled to a temperature below the glass transition temperature of the SMP material. In some embodiments, the SMP device can be coupled with an external force at block 1335. In block 1340 process 1300 ends.

Process 1350 shown in FIG. 13B begins at block 1355. At block 1360 the retention device is heated to temperatures near or above the glass transition temperature of the SMP material of the retention device. At block 1365 the joint is allowed to pull from the retention device under any influence from an external force. At block 1370 process 1350 ends.

SMP Columns

FIGS. 14A, 14B, 15A, and 15B show SMP column 1405 as fabricated and in use according to some embodiments of the invention. FIG. 14A shows SMP column 1405 fabricated in a buckled (or crooked, or bent) shape. FIG. 14B shows SMP column 1405 in a straight shape. SMP column 1405 can be fabricated in the buckled shape shown in FIG. 14A, heated to temperatures near or above the glass transition temperature of the SMP material, and formed into a straight shape as shown in FIG. 14B.

Figure 15A:
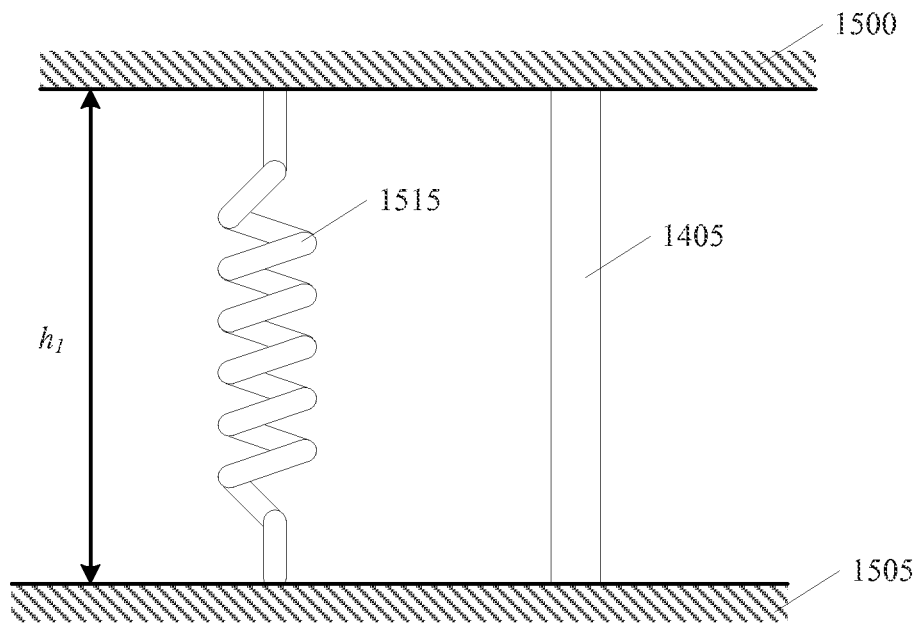
Figure 15B:
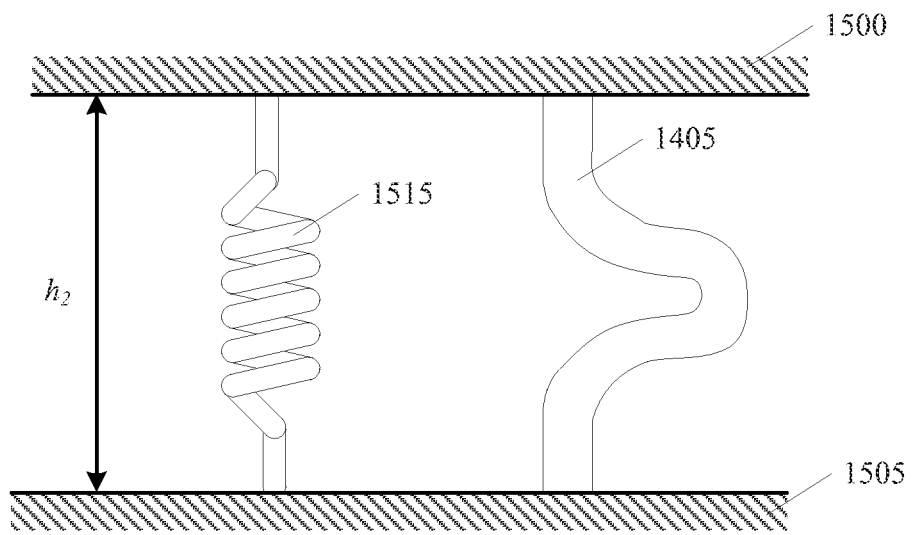

FIG. 15A shows SMP column 1405 in use according to some embodiments of the invention. SMP column 1405 provides a resistive static force in opposition to the force provided by spring 1515. That is, spring 1515 provides a force that pulls surface 1500 toward surface 1505. SMP column 1405 provides an opposite, structural, and/or static force that can keep surface 1500 at a height h1 relative to surface 1505. While spring 1515 is shown as providing a force in opposition to SMP column 1405, any other type of force can be applied and/or any other type of mechanism can apply a force. Spring 1515 can apply a compressive force on SMP column 1405. SMP column 1405 resists any type of a force. FIG. 15B shows SMP column 1405 buckled after being heated to temperatures near or above the glass transition temperature of the SMP material. When heated, SMP column 1405 returns to its original shape (e.g., the shape shown in FIG. 14A), which is a buckled or crooked shape. Because of the buckling of SMP column 1405, surface 1505 and 1500 are now separated by a height h2 that is less than h1.

While SMP column 1405 is shown being fabricated in a buckled shape like that shown in FIG. 14A, SMP column 1405 can be fabricated in a straight configuration like that shown in FIG. 14B. SMP column 1405 can still be used as a column as shown in FIG. 15A. When heated to temperatures near or above the glass transition temperature of the SMP material, SMP column 1405 can buckle from the force of spring 1515 without using the restorative action of the SMP material that comprises the column.

Figure 16A:
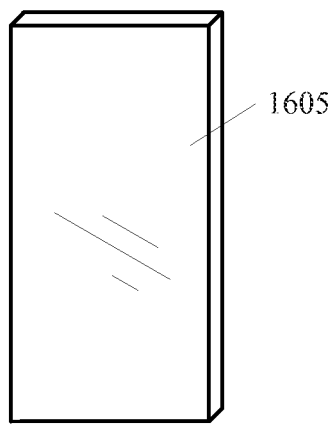
FIGS. 16A, 16B, 17A, and 17B show another SMP column as fabricated and in use according to some embodiments of the invention.
Figure 16B:
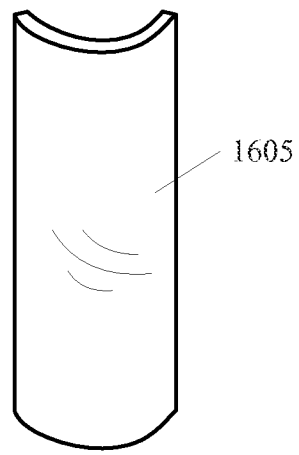

FIGS. 16A, 16B, 17A, and 17B show SMP column 1605 as fabricated and in use according to some embodiments of the invention. SMP column 1605 as shown in FIG. 16A includes an elongated flat member comprised of SMP material. SMP column 1605 can be much longer than it is wide or thick. SMP column 1605 can be heated to temperatures near or above the glass transition temperature of the SMP material and curved along the elongated length of SMP column 1605 as shown in FIG. 16B. SMP column 1605 can then be cooled to a temperature below the glass transition temperature of the SMP material. The curve along the elongated length can provide an increased moment of inertia to SMP column 1605. This increased moment of inertia may allow SMP column 1605 to support larger loads. SMP column 1605 can be coupled with structures 1705 and 1710 in any number of ways. In some cases, SMP column 1605 can be coupled with structures 1705 and/or 1710 with a rigid, a flexible, and/or a rotating attachment mechanism.

Figure 17A:
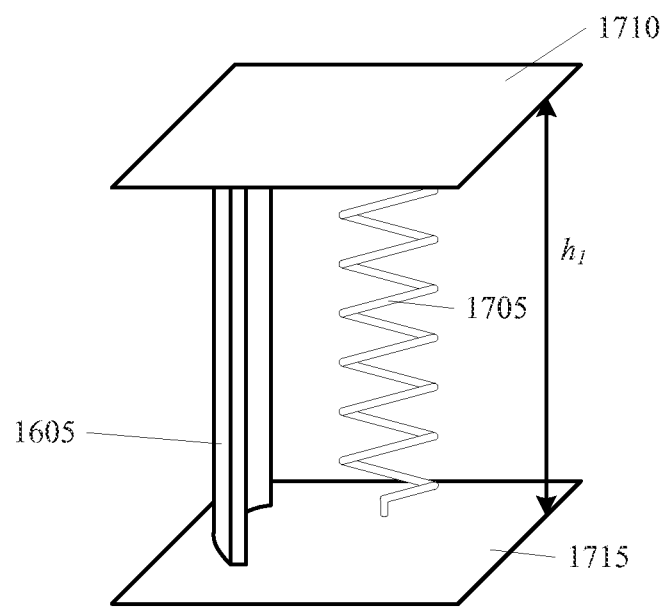
Figure 17B:
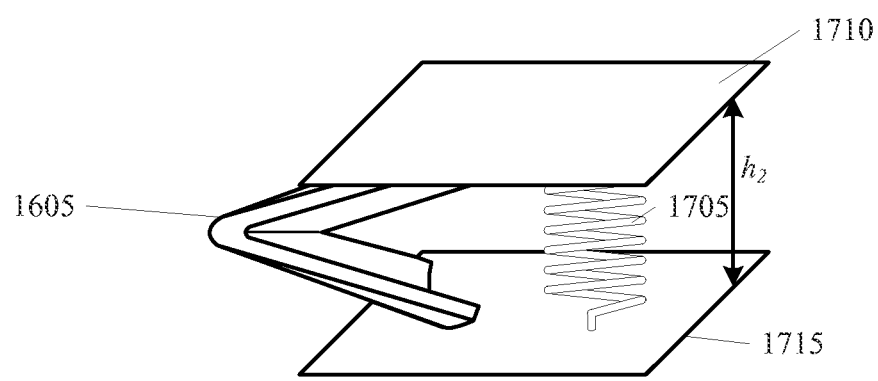

FIG. 17A shows SMP column 1605 supporting a load according to some embodiments of the invention. The curve along the elongated length of SMP column 1605 allows SMP column 1605 to support larger loads than it would without SMP column 1605.

SMP column 1605 can be heated to temperatures near or above the glass transition temperature of the SMP material. At these temperatures the SMP material will return to the original shape shown in FIG. 16A. Portions or all of SMP column 1605 will then flatten out lowering the moment of inertia of SMP column 1605 and causing SMP column 1605 to buckle under the applied load from spring 1705.

FIGS. 18A, 18B, 19A, and 19B show SMP column 1805 as fabricated and in use according to some embodiments of the invention. SMP column 1805 can include a plurality of micro-buckling elements 1810 as shown in FIG. 18A. In some embodiments, SMP column 1805 can be a hollow cylinder. Micro-buckling elements 1810 can be accordion shaped. SMP column 1805 can be heated to a temperature near or above the glass transition temperature of the SMP material and elongated as shown in FIG. 1810. When elongated, micro-buckling elements 1810 can stretch out extending the length of SMP column 1805. Once SMP column 1805 has been stretched to the appropriate length, SMP column 1805 can be cooled to a temperature below the glass transition temperature of the SMP material.

Figure 19A:
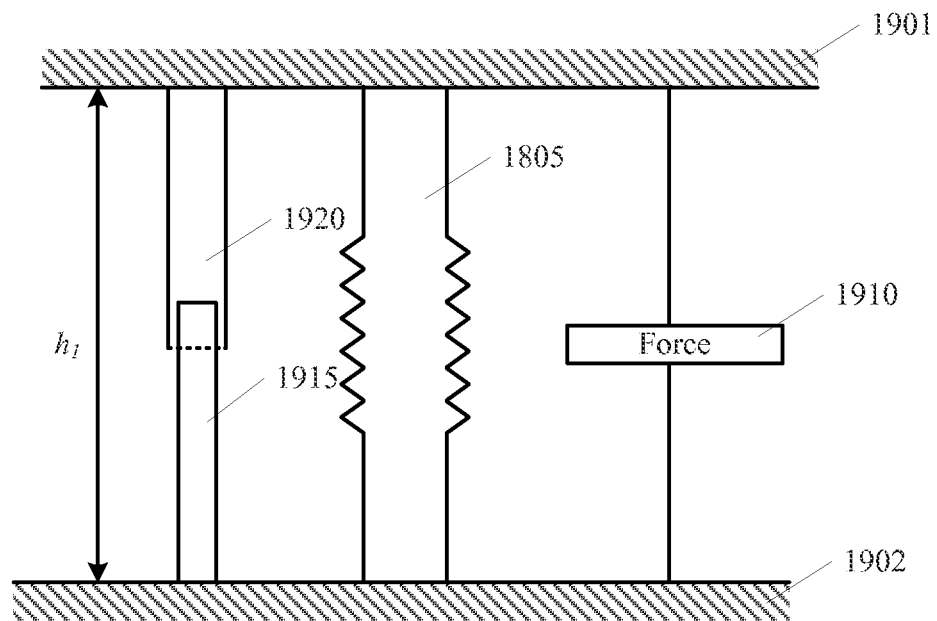
Figure 19B:
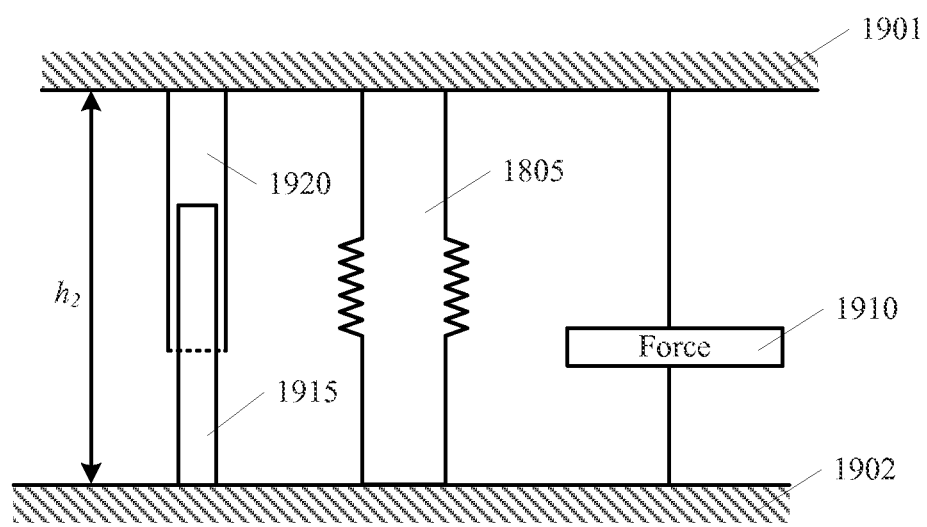

The cooled SMP column 1805 can then be used to support a load as shown in FIG. 19A. Force 1910 is applied between surface 1901 and 1902. These surfaces are likewise supported by SMP column 1805, which resists force 1910. Surfaces 1901 and 1902 can be kept a distance h1 from each other because of SMP column 1805. An alignment mechanism can be used to keep surfaces 1901 and 1902 from shifting latterly. An alignment mechanism can include complementary shafts that allow thinner shaft 1915 to slide within shaft 1920.

When SMP column 1850 is again heated to a temperature near or above the glass transition temperature of the SMP material, force 1910 can cause the micro-buckling elements to collapse or buckle, reducing the distance the two surfaces 1901 and 1902 are from each other. Thus SMP column 1805 can be used to provide a single direction actuator.

Figure 21:
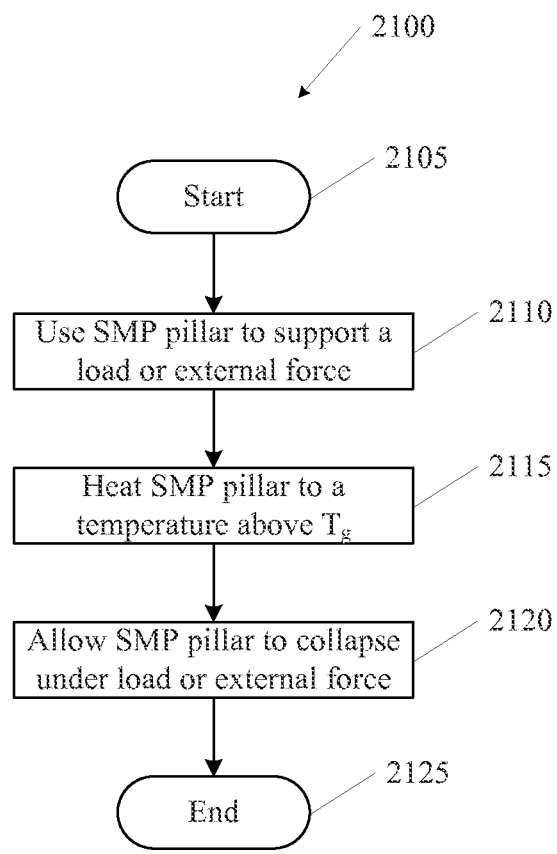

FIGS. 20A, 20B and 21 are flowchart process 2000, 2050 and 2100 for transforming and using the SMP columns as shown in FIGS. 14, 15, 16, 17, 18, and 19 according to some embodiments of the invention.

Process 2000 can begin at block 2005 in FIG. 20A. At block 2010 an SMP column (e.g., SMP column 1405, 1605, and 1805) can be formed in the collapsed configuration. The types and shapes of collapsed configurations can vary as shown above. At block 2015, the SMP column can be heated to a temperature near or above the glass transition temperature of the SMP material. At block 2020, the SMP column can be forced into an elongated configuration. Various tools, jigs, and/or apparatus can be used to force the SMP column into the elongated configuration.

At block 2025 the SMP column can be cooled to a temperature below the glass transition temperature of the SMP material. At block 2030 the SMP column can be put to use. That is, for example, the SMP column device can be coupled to an apparatus to restrict a force. At block 2035, process 2000 can end.

Process 2055 can begin at block 2055 in FIG. 20B. At block 2060 the SMP column is used to support a load. At block 2065 the SMP column is heated to a temperature near or above the glass transition temperature of the SMP material. Once heated, the SMP column can collapse under force from the external load at block 2070. Process 2050 can end at block 2075.

Process 2100 can begin at block 2105. At block 2110 an SMP pillar can be used to support a load or an external force. At block 2115 the SMP device can be heated to a temperature near or above the glass transition temperature of the SMP material. Once heated to these temperatures, the SMP column can then deform and/or collapse in response to the applied external force at block 2120. This deformation or collapse can occur from the applied external force and not from the internal shape memory characteristic of SMP materials.

SMP Wire

FIGS. 22A and 22B show SMP wire 2205 according to some embodiments of the invention. In FIG. 22A SMP wire 2205 is formed in a spring, coiled, or wound shape. In FIG. 22B SMP wire 2205 is in a straightened shape. SMP wire 2205 can be heated to a temperature near or above the glass transition temperature of the SMP material in order to change the shape from the spring configuration to the straightened configuration.

Figures 23A, 23B:
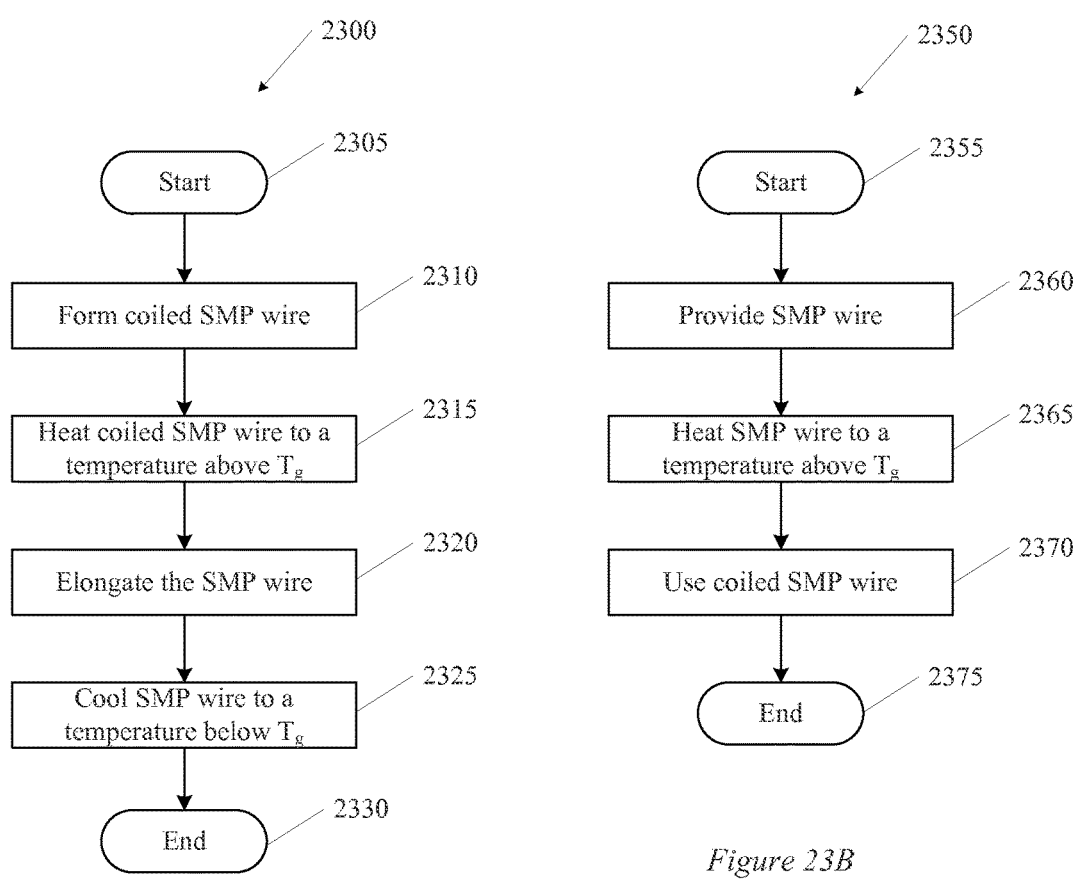
FIGS. 23A, 23B, 24A, and 24B are flowcharts of methods for transforming and using the SMP wire as shown in FIG. 23 according to some embodiments of the invention.

FIGS. 23A, 23B, 24A, and 24B are flowcharts of process 2300, 2350, 2400, and 2450 for transforming and using the SMP wire as shown in FIG. 23 according to some embodiments of the invention.

Process 2300 starts at block 2305 in FIG. 23A. An SMP wire is formed in a coiled, spring, or wound shape at block 2310. At block 2315, the SMP wire is heated to a temperature near or above the glass transition temperature of the SMP material. At block 2320, the SMP wire is elongated and/or stretched while heated to a temperature near or above the glass transition temperature of the SMP material, after which at block 2325 the SMP wire can be cooled to a temperature below the glass transition temperature of the SMP material. Process 2300 can end at block 2330.

Process 2350 starts at block 2355 in FIG. 23B. The elongated SMP wire is provided at block 2360. At block 2365 the SMP wire is heated to a temperature near or above the glass transition temperature of the SMP material. When heated to such a temperature, SMP wire returns to its original coiled, spring, or wound shape. At block 2370 the SMP coil can be cooled to a temperature below the glass transition temperature of the SMP material. Process 2350 can end at block 2375.

Figures 24A, 24B:
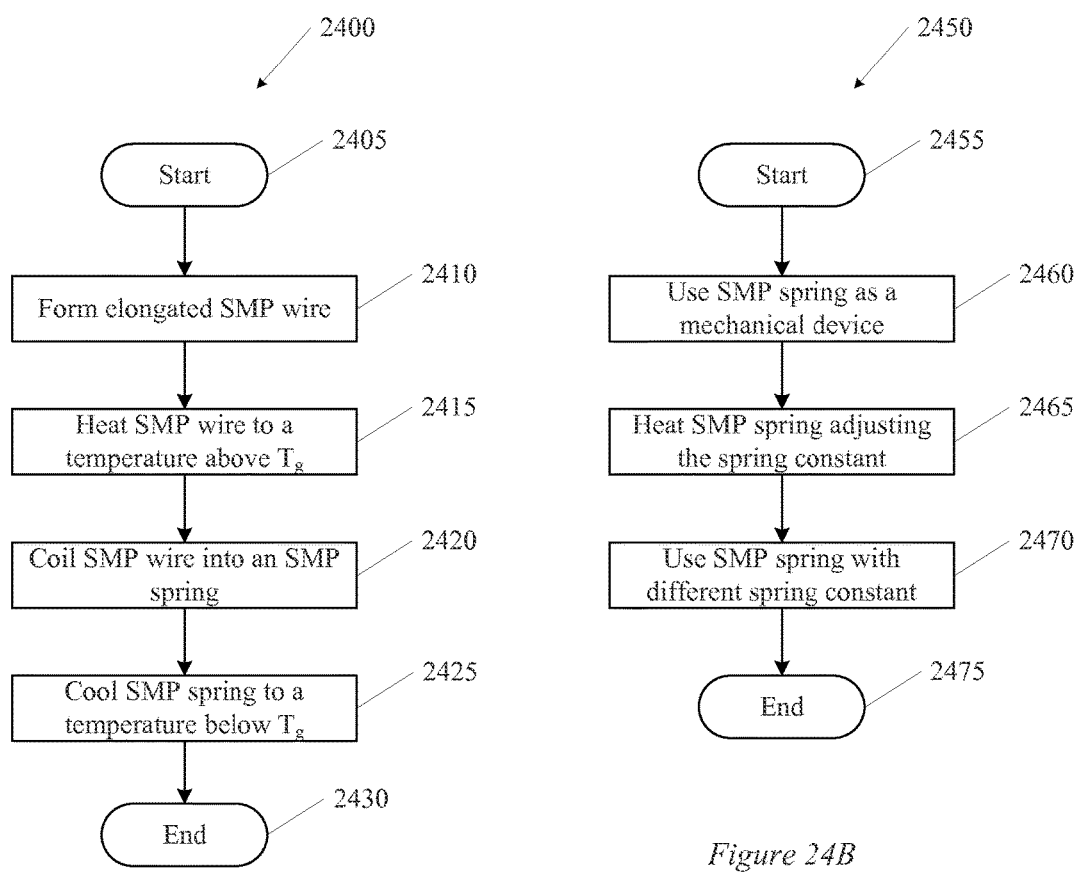

In FIG. 24A process 2400 starts at block 2405. At block 2410 an elongated SMP wire is formed from SMP material (e.g., like SMP wire 2205 in 22B). At block 2415 the SMP wire is heated to a temperature near or above the glass transition temperature of the SMP material. At block 2420 the SMP wire is formed into a coiled configuration (e.g., like SMP wire 2205 in 22A). At block 2425 the SMP wire can be cooled to a temperature below the glass transition temperature of the SMP material. And process 2400 can end at block 2430. At some point, the SMP spring may need to elongated or change back to the original shape. This can be done by heating the SMP back to a temperature above the glass transition temperature.

Figure 25:
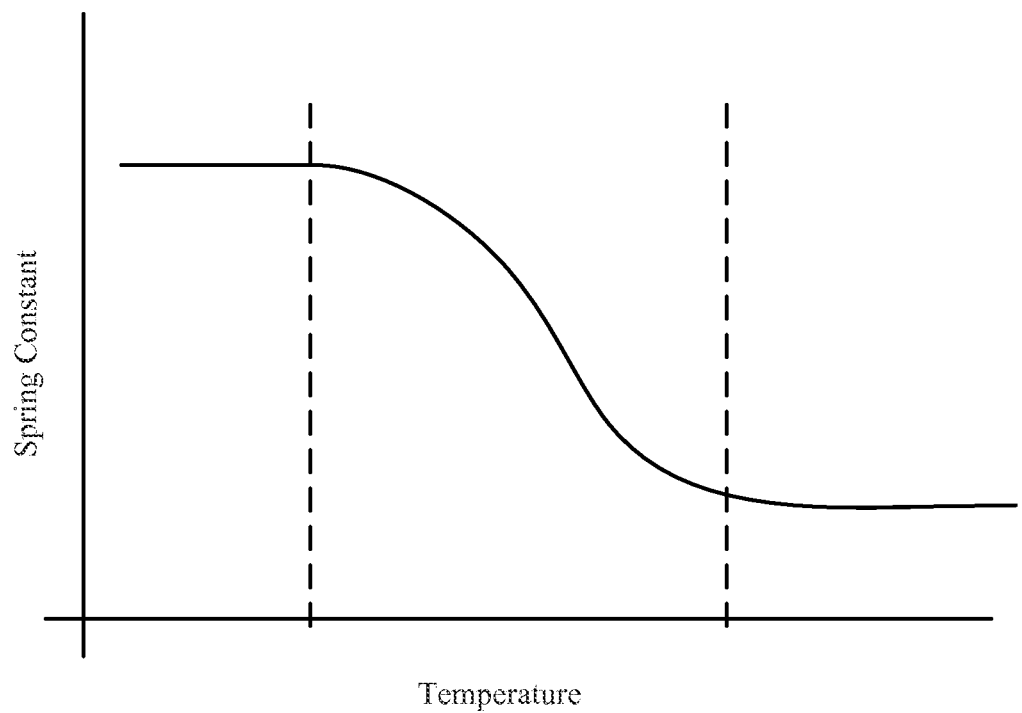
FIG. 25 shows a graph of the spring constant vs. temperature for SMP material.

Process 2450 is shown in FIG. 24B and starts at block 2455. At block 2460 the coiled SMP spring can be used in a mechanical application. This SMP spring can be an SMP spring formed using process 2400 or an SMP spring fabricated in a coiled configuration. At block 2465 the SMP spring is heated to adjust the spring constant of the material. FIG. 25 is a graph that shows how spring constant changes with heat. Heat can be applied using various electrical heaters coupled with the SMP spring. Returning to FIG. 24B, at block 2470 the SMP spring can be used with the different spring constant. Process 2450 can end at block 2475. In such embodiments the SMP spring can act as a variable spring constant spring.

FIG. 25 shows a spring constant curve temperature. As noted in the figure, the spring constant of SMP materials varies inversely with temperature over a range of temperatures. Thus, as the temperature of the SMP device varies, the spring constant will likewise vary. Typically, the spring constant of the SMP device will decrease as the temperature increases. Thus, embodiments of the invention provide for springs that have spring constants that vary with temperature.

SMP Panels

Figure 26A:
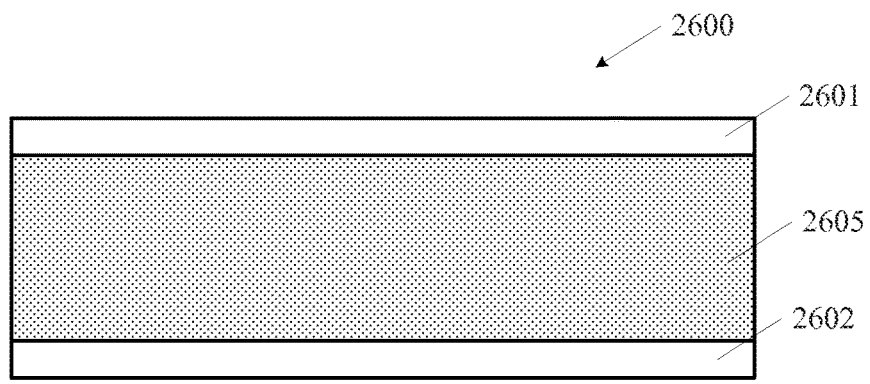
FIGS. 26A, 26B, and 26C show a collapsible SMP sandwich panel according to some embodiments of the invention.
Figure 26B:
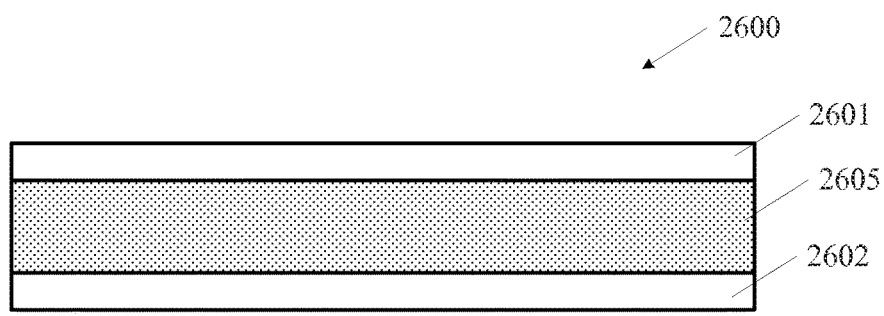
Figure 26C:
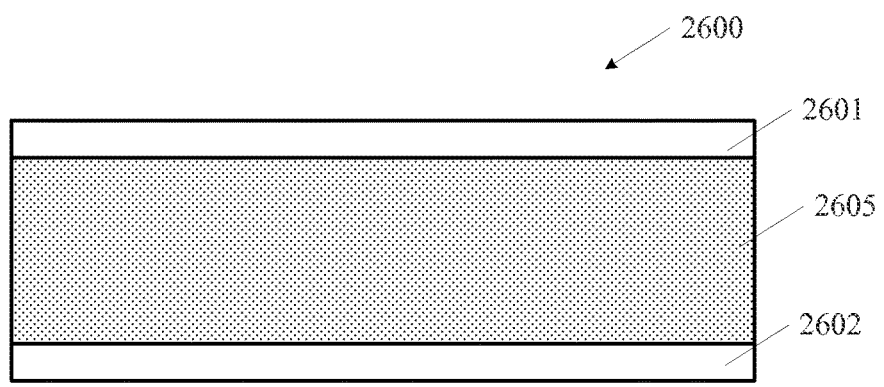

FIGS. 26A, 26B, and 26C show collapsible SMP sandwich panel 2600 in the original, compressed, and original shapes, respectively, according to some embodiments of the invention. As shown in FIG. 26A, SMP sandwich panel 2600 includes face sheets 2601 and 2602, and SMP layer 2605. Face sheets 2601 and 2602 can include any type of material and can be rigid or flexible. In some embodiments, face sheets 2601 and 2602 can be constructed from thin metallic materials, fiber reinforced materials, composite materials, etc. Core 2605 can include SMP materials. FIG. 26A shows SMP sandwich panel 2600 in the original configuration.

FIG. 26B shows SMP sandwich panel 2600 in a compressed configuration. Once heated to a temperature near or above the glass transition temperature of the SMP material, SMP sandwich panel 2600 can be forced into the compressed configuration by forcing face sheets 2601 and 2602 together. In the compressed configuration, core 2605 of SMP sandwich panel 2600 is compressed by this external force. SMP sandwich panel 2600 can then be cooled to a temperature below the glass transition temperature of the SMP material and held in the compressed configuration.

SMP sandwich panel 2600 can be reheated to a temperature near or above the glass transition temperature of the SMP material. SMP sandwich panel 2600 can then return to the original shape. An external force may contribute to SMP sandwich panel 2600 transition from the compressed to the original shape. SMP sandwich panel 2600 can be used in various configurations or embodiments where the thickness of a material varies over time.

Figures 27A, 27B:
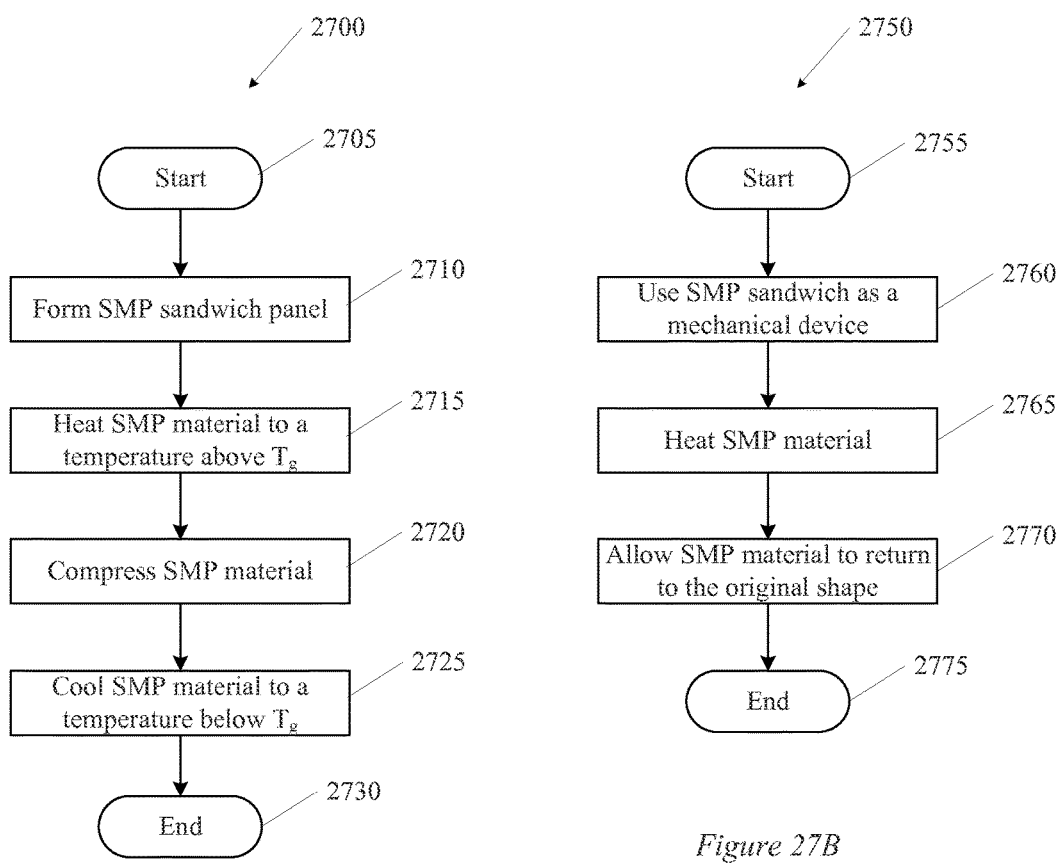
FIGS. 27A and 27B are flowcharts of methods for transforming the SMP panel shown in FIG. 25 into another shape according to some embodiments of the invention.

FIGS. 27A and 27B are flowcharts of processes 2700 and 2750 for transforming the SMP panel shown in FIG. 25 to another shape according to some embodiments of the invention. Process 2700 begins at block 2705. At block 2710 the SMP sandwich panel (e.g., SMP sandwich panel 2600) can be formed in the original state (see e.g., FIG. 26A). At block 2715 the SMP sandwich panel can be heated to a temperature near or above the glass transition temperature of the SMP material. At block 2720 the SMP sandwich panel can be compressed (see e.g., FIG. 26B). At block 2725, the SMP sandwich panel can be cooled to a temperature below glass transition temperature. At block 2730, process 2700 can end.

Process 2750 in FIG. 27B begins at block 2755. At block 2760 the SMP sandwich panel can be used in any of various applications. At block 2765 the SMP material (e.g., SMP core 2605) can be heated to a temperature near or above the glass transition temperature of the SMP material. At block 2770 the SMP panel can be allowed to return to the original shape. The fundamental nature of SMP materials allows the SMP sandwich panel to change back to the original shape. In some embodiments, the SMP sandwich panel can return to the original shape with the restorative behavior of the SMP core. In other embodiments, the SMP sandwich panel can return to under an external force. At block 2775, process 2750 can end.

Figures 28A, 28B:
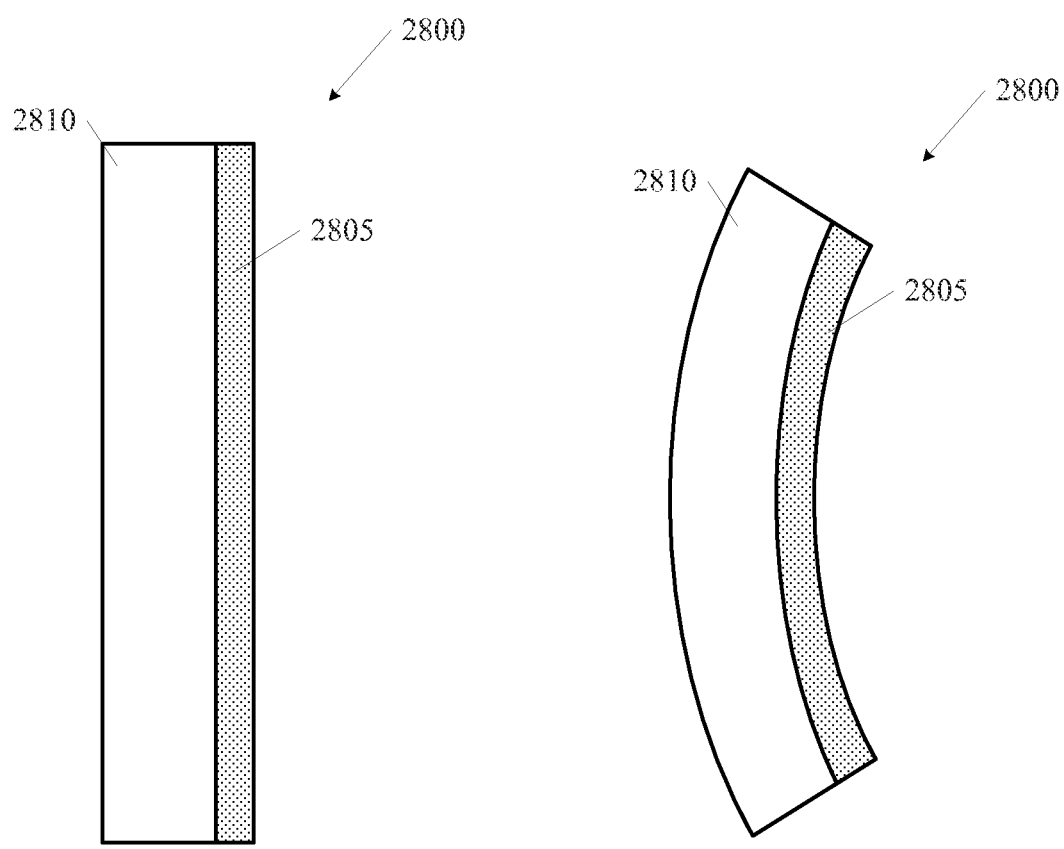
FIGS. 28A and 28B show an SMP panel in a shaped and morphed configuration according to some embodiments of the invention.

FIGS. 28A and 28B show SMP panel 2800 in a shaped and morphed configuration according to some embodiments of the invention. In FIG. 28A, SMP panel 2800 includes face skin 2805 and SMP material 2810. The SMP material can be similar to the SMP materials described elsewhere in this disclosure. Likewise the face skin can be similar to the face skin described elsewhere in this disclosure. In some embodiments, face skin 2805 and SMP material 2810 may have different coefficients of thermal expansion. Because of this difference, as the two materials are heated to a temperature near or above the glass transition temperature of the SMP material, the two materials will expand at different rates. This expansion will cause SMP panel 2800 to bow or curve as shown in FIG. 28B. If the temperature of the SMP material 2810 is lowered below the glass transition temperature, SMP material 2810 will maintain the curved shape.

Figures 29A, 29B:
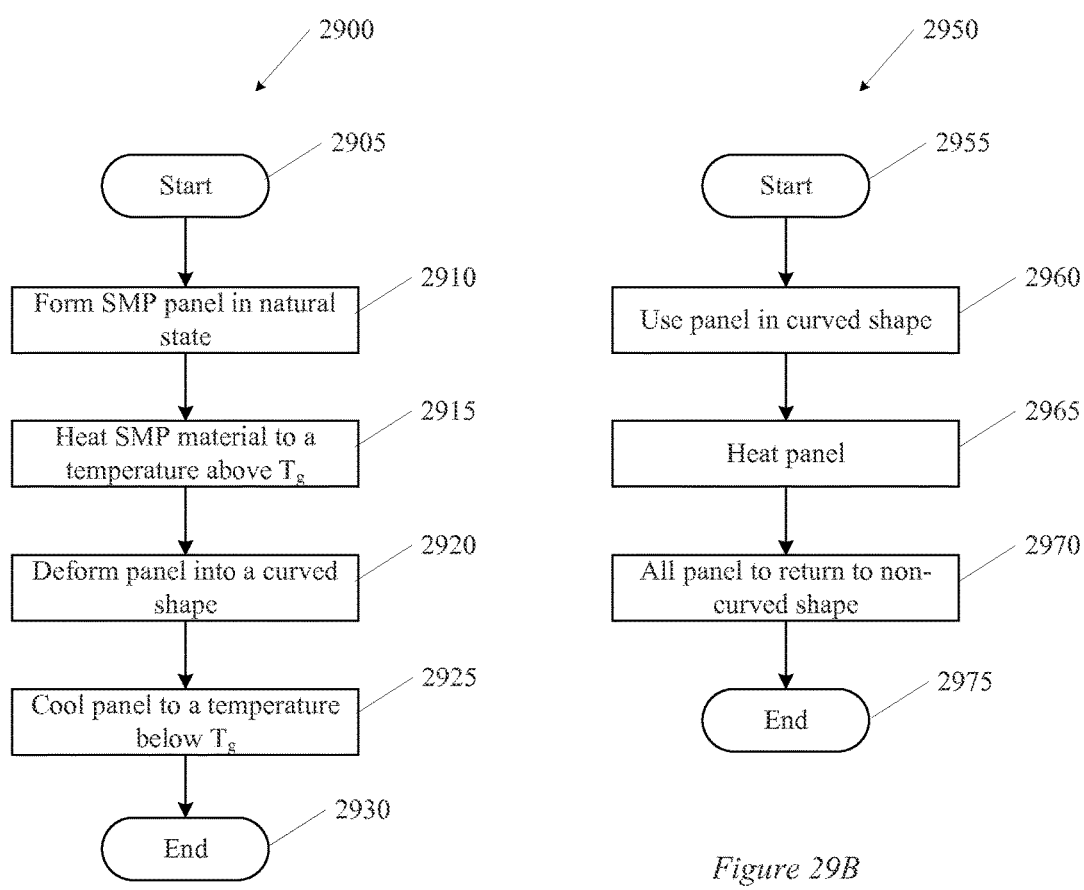
FIGS. 29A and 29B are flowcharts for transforming the SMP panel shown in FIG. 28 into another shape according to some embodiments of the invention.

FIGS. 29A and 29B are flowcharts of processes 2900 and 2950 for transforming an SMP panel (e.g., like the one shown in FIG. 28) into another shape according to some embodiments of the invention. The SMP panel can include a face sheet and an SMP layer. Process 2900 in FIG. 29A starts at block 2905. At block 2910 a two-layer sandwich panel is formed in the original shape (e.g., the shape shown in FIG. 28A). At block 2915 the SMP layer and/or the face sheet can be heated to a temperature near or above the glass transition temperature of the SMP material. The panel can then naturally and/or under an external force deform into a curved or bowed shape at block 2920. At block 2925 the SMP material and/or face sheet can be cooled to a temperature below the glass transition temperature of the SMP material. At this point the SMP panel may retain its curved or bowed shape. Process 2900 can then end at block 2930.

Process 2950, in FIG. 29B, begins at block 2955. At block 2960 an SMP panel is used in its curved configuration (e.g., see FIG. 28B). The SMP panel can be heated to a temperature near or above the glass transition temperature of the SMP material within the SMP panel at block 2965. After heating, the SMP panel can return to its original, non-curved shape at block 2970. At block 2975, process 2950 can end.

FIGS. 28 and 29 show SMP panels formed in a straight shape and deformed into a curved shape. SMP panels can also be formed in a curved shape, heated to a temperature near or above the glass transition temperature of the SMP material, formed into a straight shape, cooled to a temperature below the glass transition temperature of the SMP material, and used in the straight shape. Later, the SMP panel can be heated to a temperature near or above the glass transition temperature of the SMP material and SMP panel can return to the original shape naturally or by application of an external force.

SMP Rivets

FIGS. 30A, 30B, 30C and 30D show SMP rivets 3005 as fabricated, transformed under temperature, placed in use, and in use according to some embodiments of the invention. FIG. 30A shows SMP rivet 3005 in its original shape. SMP rivet 3005, in its original shape, includes factory head 3015 and shop head 3020. SMP rivet 3005 can be constructed from any type of SMP material. FIG. 30B shows SMP rivet 3005 in its deformed shape. In the deformed shape, SMP rivet 3005 includes only factory head 3015. Shop head 3020 is completely removed. SMP rivet 3005 can be transformed into the deformed shape after being heated to a temperature near or above the glass transition temperature of the SMP material. Upon cooling, SMP rivet 3005 can remain in the deformed state.

In use, SMP rivet 3005, in its deformed state, can be used to secure or attach to materials together. For example, SMP rivet 3005 can be used to secure sheets 3010 and 3011 together as shown in FIG. 30C. While only two sheets are shown, any number of materials can be used. While two sheets are shown, SMP rivet 3005 can be used to secure any types of materials together. SMP rivet 3005 can be inserted into aligned holes within 3010 and 3011. The width of the two materials combined can have about the same dimension as SMP rivet 3005 between factory head 3015 and shop head 3020. Once placed within the threaded socket, SMP rivet 3005 can be heated to a temperature near or above the glass transition temperature of the SMP material. SMP rivet 3005 can then transition to its original shape with or without application of an external force. This force, for example, can be a tensile or compressive force. In the original shape, the SMP rivet includes factory head 3015. The two sheets 3010 and 3011 can be secured together between shop head 3020 and factory head 3015. SMP rivet 3005 can support tension loads (loads parallel to the axis of SMP rivet 3005) and shear loads (loads perpendicular to the axis of SMP rivet 3005).

Figures 31A, 31B:
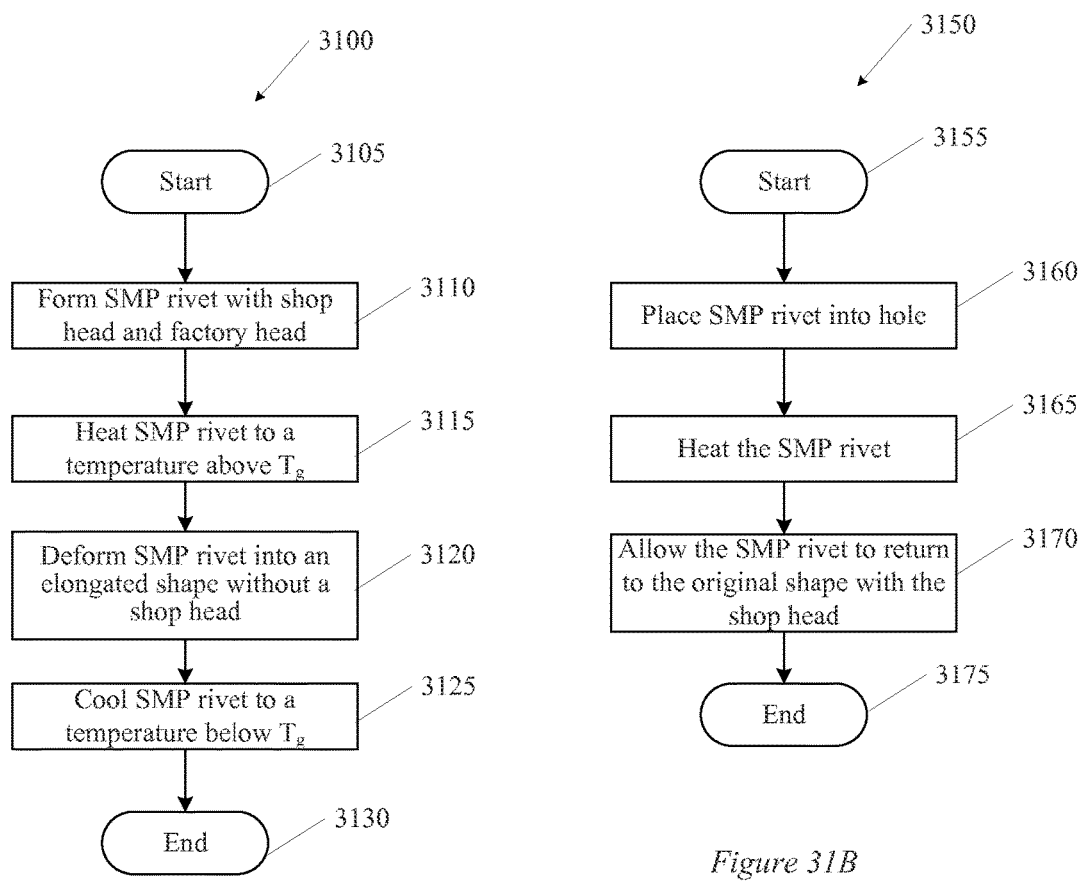
FIGS. 31A and 31B are flowcharts of methods for transforming and using the SMP bolt shown in FIG. 30 according to some embodiments of the invention.

FIGS. 31A and 31B are flowcharts of process 3100 and 3150 for transforming and using an SMP rivet according to some embodiments of the invention. Process 3100, shown in FIG. 31A, begins at block 3105. At block 3110, an SMP rivet is formed in its original shape with a shop head and a factory head (e.g., see FIG. 31A). At block 3115 the SMP rivet is heated to a temperature near or above the glass transition temperature of the SMP material. At block 3120 the SMP rivet is deformed (or transformed) into an elongated shape without the shop head. At block 3125 the SMP rivet is cooled to a temperature below the glass transition temperature of the SMP material. Process 3100 can end at block 3130.

Process 3150, shown in FIG. 31B, begins at block 3155. At block 3160, an elongated SMP rivet, without a shop head, is inserted into a threaded socket. This threaded socket, for example, can be a hole within two or more materials that are to be riveted together. At block 3165, the SMP rivet can be heated to a temperature near or above the glass transition temperature of the SMP material. At block 3170 SMP rivet can return to the original shape with the shop head. This can be done by the natural restorative nature of the SMP material and/or aided by an outside force. Regardless of the mechanism, a shop head is formed, and the SMP rivet is snugly affixed within the hole. Process 3150 can end at block 3175.

Figure 32A:
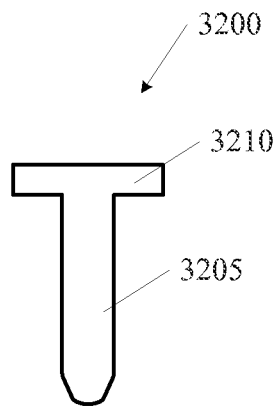
FIGS. 32A, 32B, and 32C show an SMP rivet as fabricated, placed in use, and in use according to some embodiments of the invention.
Figure 32B:
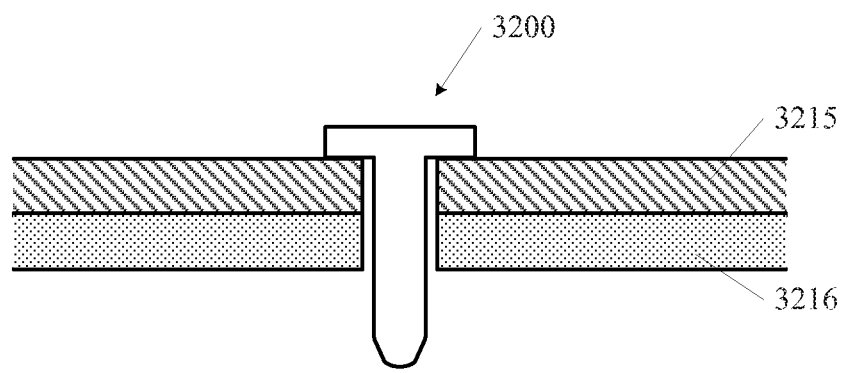
Figure 32C:
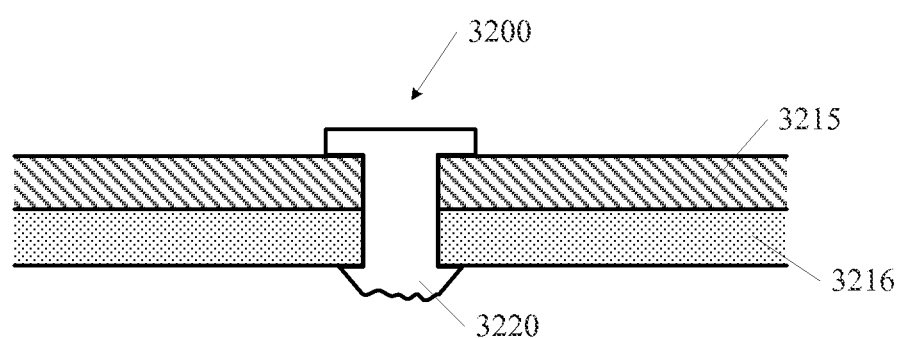

FIGS. 32A, 32B, and 32C show SMP rivet 3200 as fabricated, placed in use, and in use according to some embodiments of the invention. FIG. 32A shows SMP rivet 3200 in its original as fabricated shape. SMP rivet 3200 can be constructed from any type of SMP material. SMP rivet can include shaft 3205 and factory head 3210.

FIG. 32B shows SMP rivet 3200 inserted into a hole formed within two sheets 3215 and 3216. While only two sheets are shown, any number of sheets can be used. And while sheets are shown, SMP rivet 3200 can be used to secure any types of materials together. After SMP rivet 3200 has been inserted into the hole, SMP rivet 3200 can be heated to a temperature near or above the glass transition temperature of the SMP material and deformed as shown in FIG. 32C. In some embodiments, this deformation may produce shop head 3220 on SMP rivet 3200. This deformation requires an external force to reshape SMP rivet 3200. Specialty tools may be used and/or a blunt instrument can strike the shop head end of SMP rivet 3200 deforming SMP rivet 3200 as shown. In some embodiments, this deformation may cause the diameter of shaft 3205 to expand, filling in any unused space within the hole. SMP rivet 3200 after deformation can secure sheets 3215 and 3216 together.

FIGS. 33A and 33B are flowcharts of process 3300 and 3350 for transforming and using the SMP rivet shown in FIG. 32 according to some embodiments of the invention. Process 3300 begins at block 3305 in FIG. 33A. At block 3310, an SMP rivet (e.g., SMP rivet 3200) is formed in its original shape without a shop head and with a factory head (e.g., see FIG. 32A). At block 3315 the SMP rivet is placed within a hole. This hole can include holes from multiple sheets, materials, panels, and/or apparatuses. At block 3320 the SMP rivet is deformed to include a shop head. Process 3300 can end at block 3325.

FIG. 33B shows process 3350, which begins at block 3355. At block 3360 SMP rivet (e.g., SMP rivet 3200) is heated to a temperature near or above the glass transition temperature of the SMP material. The SMP rivet could have been previously inserted into a hole and deformed to include a shop head (e.g., as shown in FIG. 32C). The SMP rivet is then allowed to return to its original shape at block 3365. In some embodiments, an outside force can be used to help the SMP rivet return to its original shape. For example, the SMP rivet and/or the material within which it is attached can be mechanically or acoustically vibrated while at a temperature above the glass transition temperature of the SMP material. Other external forces may be used. The heat, possibly in combination with an external force, can allow the SMP rivet to be removed as shown in block 3370. At block 3375 process 3350 can end.

SMP rivet 3200 and/or process 3300 and 3350 can be used in various manufacturing processes such as automobile manufacturing. In some embodiments, SMP rivet 3200 can be used to secure a fixture to the frame of an automobile. For example, SMP rivet 3200 can be used to secure a door panel (e.g., sheet 3216 in FIGS. 32A, 32B, and 32C) to a doorframe (e.g., sheet 3215 in FIGS. 32A, 32B and 32C). Process 3300 can be used to secure SMP rivet 3200. Process 3350 can be used to remove SMP rivet 3200 and, for example, ultimately remove the door panel from the doorframe. The removal process can occur at a junkyard and/or at an automobile recycling center.

SMP Pins

Figure 34C:
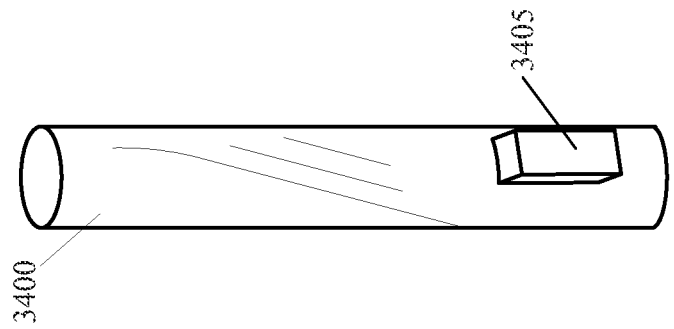
FIGS. 34A, 34B and 34C show an SMP pin with a detent in an original shape and two twisted configurations according to some embodiments of the invention.
Figure 34B:
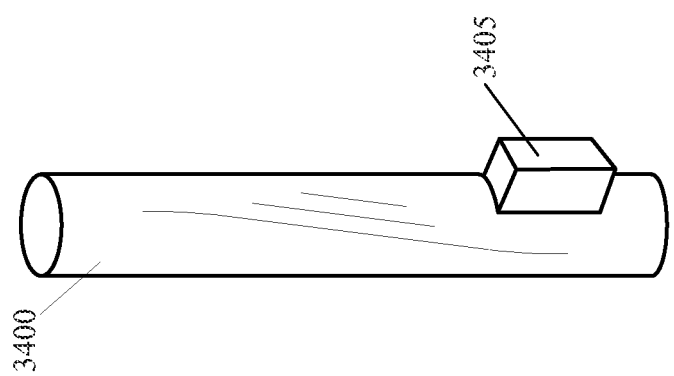
Figure 34A:
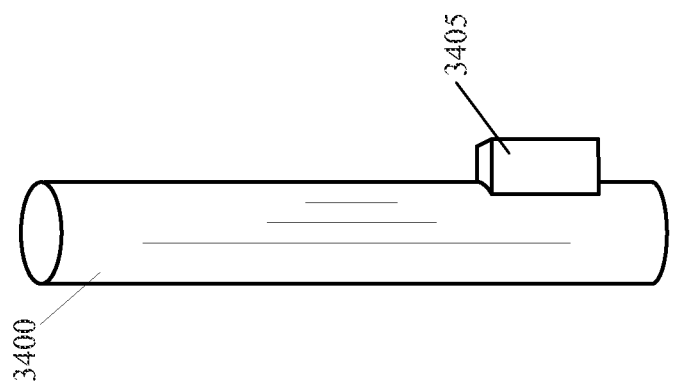

FIG. 34A show SMP pin 3400 with detent 3405 in an original shape according to some embodiments of the invention. SMP pin 3400 is a cylindrical member made at least partially from SMP materials. FIGS. 34B and 34C show SMP pin 3400 twisted along the longitudinal length of SMP pin 3400. When twisted, the bottom portion of SMP pin 3400 and detent 3405 are twisted relative to the upper portion of SMP pin 3400. SMP pin 3400 can be twisted from the original shape shown in FIG. 34 to a second shape (e.g., either of the shapes shown in FIG. 34B or 34C), when heated to a temperature near or above the glass transition temperature of the SMP material. An external force can be applied to transform the pin from the original shape to the second shape. This force, for example, can be a torsion force applied by an external tool or tools. After twisting, SMP pin 3400 can be cooled to a temperature below the glass transition temperature of the SMP material. SMP pin 3400 will then maintain the second shape.

SMP pin 3400 will return to the original shape or a shape close thereto, when reheated to a temperature near or above the glass transition temperature. In some situations, SMP pin 3400 may be maintained at a temperature near or above the glass transition temperature for a period of time sufficient to allow the SMP to recover and allow the pin to return to or close to the pin's original shape. While SMP pin 3400 is shown twisted about 90 degrees, SMP pin 3400 can be twisted any degree. For example, SMP pin 3400 can be twisted 45, 90, 135, 180, 235, 270, 315, or 360 or more degrees. The length of the SMP pin and/or the type of SMP material used may limit the degree of twisting.

SMP pin 3400 may be completely or partially comprised of SMP material. For example, the ends of SMP pin 3400 may be comprised of a material other than SMP material. A central pin may also be used that is or is not comprised of SMP material that limits twisting to twisting along the longitudinal length of SMP pin 3400. Moreover, detent 3405 can be comprised of any type of material.

FIG. 35A shows flow chart of process 3500 for creating an SMP pin. Process 3500 starts at block 3505. At block 3510 the SMP pin can be formed with a detent. The SMP pin can be formed from any manufacturing process that can produce a pin with a detent. SMP pin can be formed at least partially from SMP material and/or can be formed in a substantially cylindrical shape. In some configurations, the ends of the pin can be manufactured from non-SMP material.

At block 3515, the SMP pin can be heated to a temperature near or above the glass transition temperature of the SMP material. Once heated, the pin can be twisted such that the detent is twisted relative to other portions of the pin at block 3520. The pin can then be cooled below the glass transition temperature at block 3525 while being held within the twisted configuration. At block 3530, process 3500 can end.

Figure 36A:
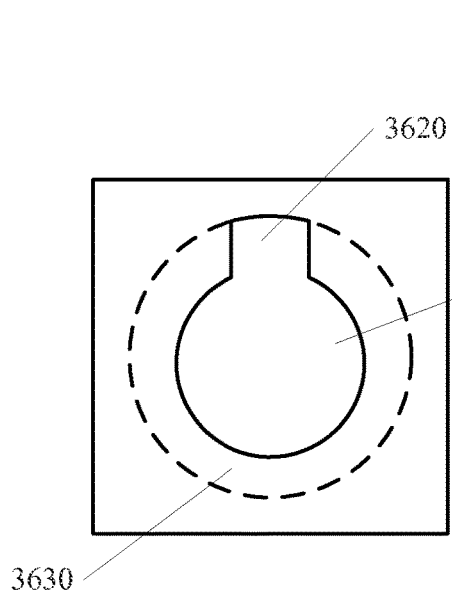
FIGS. 36A, 36B, and 36C show a socket that can be used with the SMP pin shown in FIG. 34 according to some embodiments of the invention.
Figure 36B:
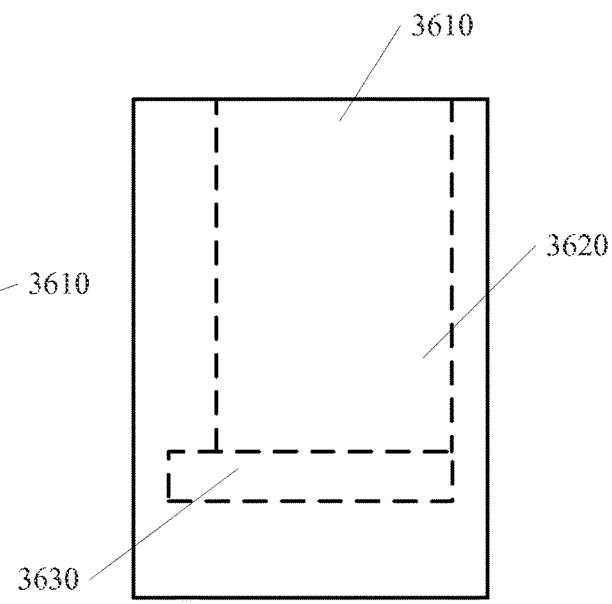
Figure 36C:
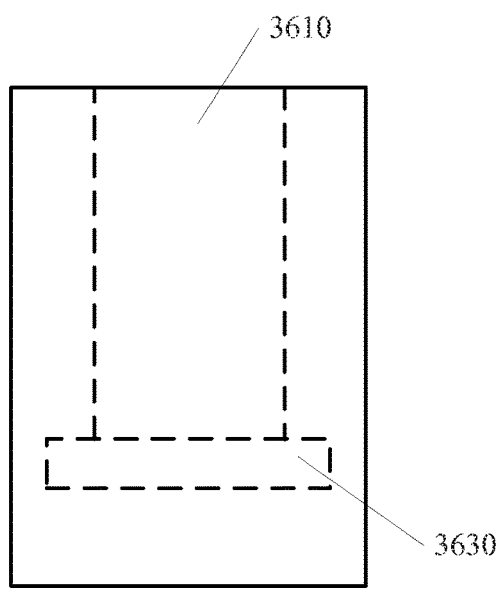

Process 3550, shown in FIG. 35B, shows a flowchart for using the SMP pin according to some embodiments of the invention. Process 3550 begins at block 3555. At block 3560 SMP pin 3400 can be inserted into socket 3610 (shown in FIGS. 36A, 36B and 36C) that allows for passage of the pin and the detent. FIG. 36A shows a top view, FIG. 36B shows a side view, and FIG. 36C shows an end view of socket 3610 and the channels. In some configurations, socket 3610 can have a diameter larger than the diameter of the pin without the detent, longitudinal channel 3620 that can allow passage of the detent, and transverse channel 3630.

Figure 37A:
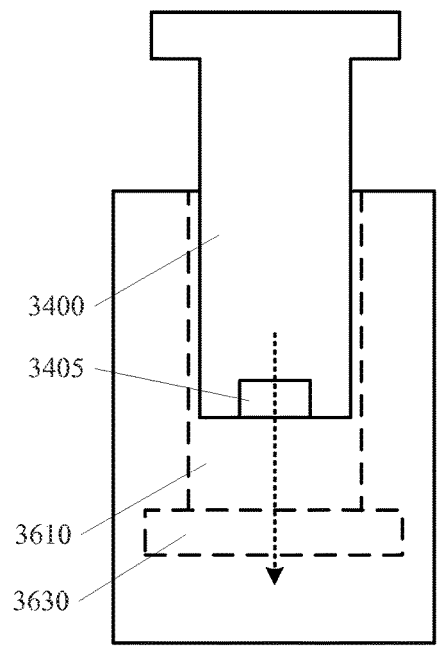
FIGS. 37A, 37B, 37C, and 37D show the SMP pin in FIG. 34 interacting with the socket shown in FIG. 36 according to some embodiments of the invention.
Figure 37B:
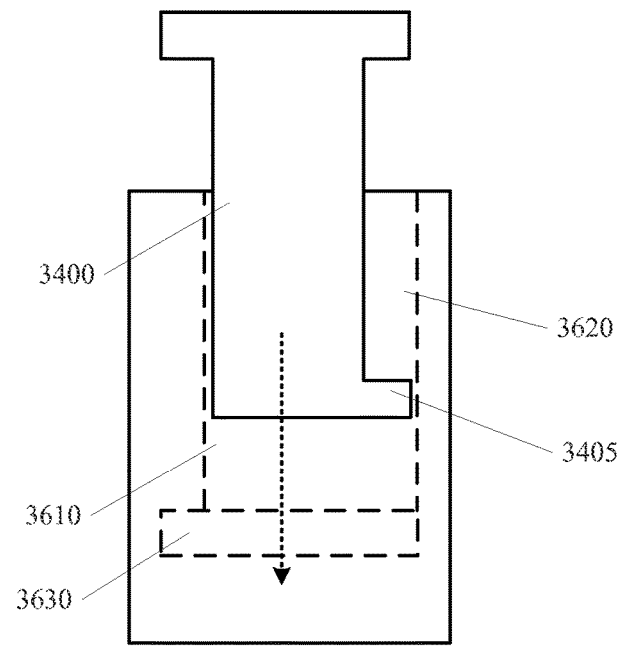

FIGS. 37A and 37B show a side view and an end view of SMP pin 3400 being inserted into socket 3610. Longitudinal channel 3620 provides an additional channel for detent 3405 to pass through socket 3610. At block 3575 SMP pin is cooled to a temperature below the glass transition temperature.

Figure 37C:
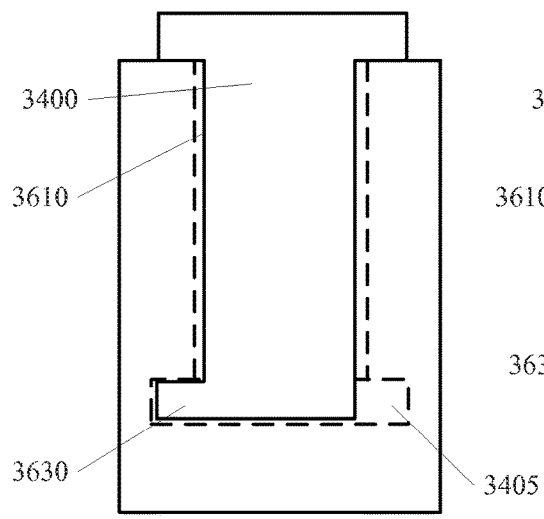
Figure 37D:
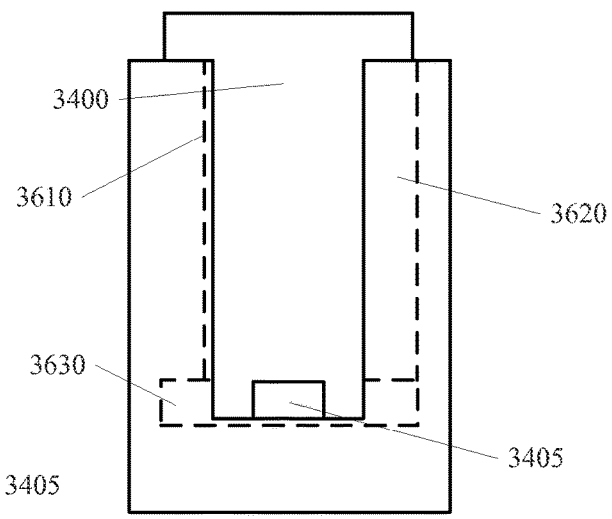

Returning to FIG. 35B, at block 3565 SMP pin 3410 can be heated to a temperature near or above the glass transition temperature. At block 3570, SMP pin 3410 can be allowed to twist back to the original shape causing the detent to interfere with transverse channel 3630. An example of this is shown schematically in FIGS. 37C and 37D. FIGS. 37C and 37D show side and top views of detent 3405 twisted within socket 3610 such that detent 3405 mechanically interferes with the top of transverse channel 3630 restricting pin 3410 from being extracted from socket 3610. In this example detent 3405 rotates approximately 90 degrees. However, any rotation may be sufficient so long as the rotation rotates the pin from a position that is free to a position that locks the pin.

Referring back to FIG. 35B, process 3550 may end at block 3580.

Figure 38C:
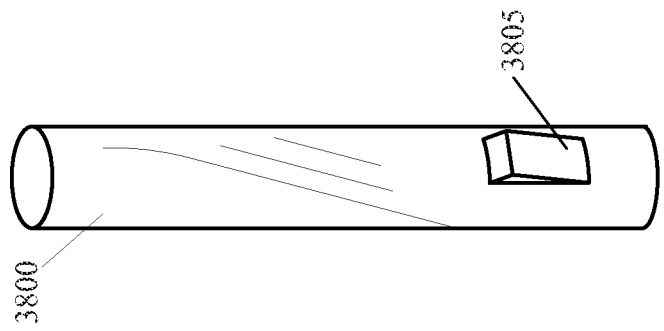
FIGS. 38A, 38B and 38C show an SMP pin with a wedge detent in the original shape and two twisted configurations according to some embodiments of the invention.
Figure 38B:
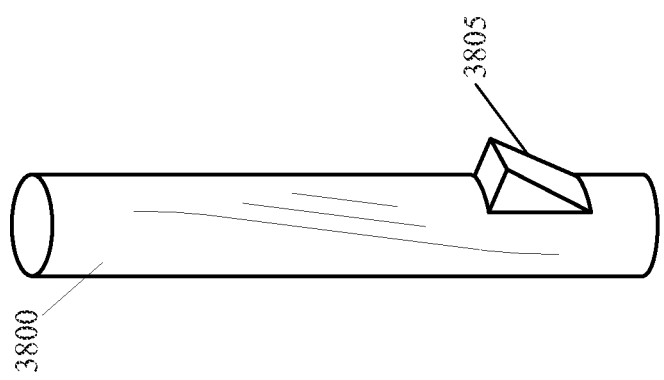
Figure 38A:
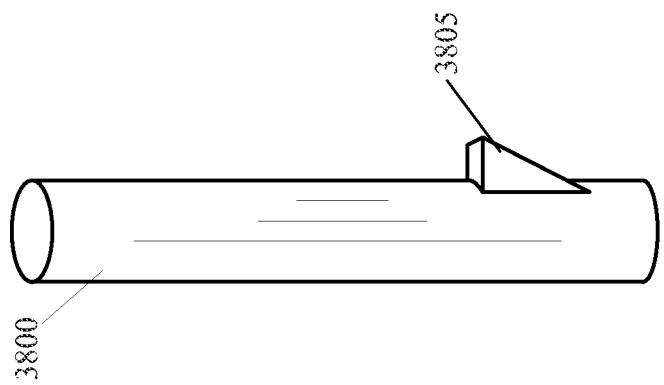

In other embodiments of the invention, SMP pin 3800 can have detent 3805 that is angled toward the bottom of the SMP pin in a wedge shape as shown in FIGS. 38A, 38B and 38C. Both SMP pin 3800 and/or detent 3805 can be similar to SMP pin 3400 and/or detent 3405. SMP pin 3800 can be inserted into socket 3600 in a twisted configuration. In this embodiment, detent 3805 does not slide into socket 3610 through channel 3620. Instead, detent 3805 is jammed into the socket until the top surface of detent 3805 engages with transverse channel 3630. In this embodiment, SMP pin 3800 can be removed by heating SMP pin 3800 above the glass transition temperature. Above this temperature, SMP pin 3800 will twist and detent 3805 can line up with channel 3620 allowing SMP pin 3800 to be removed under an external force.

In some embodiments, SMP pin 3400 and/or SMP pin 3800 can be tapered along the longitudinal length of the pin. The end nearest the detent, for example, can have a smaller diameter than the other end.

Embodiments of the invention often use external forces to modify the shape of an SMP device. An external force can be applied by hand or by a hand tool that is not integral with the SMP device and/or system. An external force can also be provided by an elastic member or force within the system. And an external force can be applied with an embedded elastic element such as the one shown in FIG. 3E.

Embodiments of the invention also require heating of an SMP device. Heat can be applied using convective heating (in an oven, hot air gun, etc.), radiation (i.e. UV lamps), inductive heating, RF heating, IR heating, resistive heating (embedded or surface mounted resistive wire heater), etc. This could also involve modifying the SMP with conductive fillers, fibers, etc. so that a voltage can be applied to the device itself for resistive heating. In the case of a device that contains a metallic component (like a spring), the spring may also be used as a resistive heating element.

Different arrangements of the components depicted in the drawings or described above, as well as components and steps not shown or described are possible. Similarly, some features and subcombinations are useful and may be employed without reference to other features and subcombinations. Features, components, benefits, methods, or processes described in conjunction with one embodiment can be applied to any other embodiment. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

The invention claimed is:

1. A shape memory polymer device comprising:
a body consisting essential of a shape memory polymer and a spring, the body further comprising a first state and a second state, wherein the shape of the body in the first state is distinct from the shape of the body in the second state,
wherein the shape memory polymer device is configured to transition from the second state to the first state when the shape memory polymer device is heated to a temperature near or above the glass transition temperature of the shape memory polymer material and the spring provides a force on the body,
wherein the force provided by the spring is large enough to transform the body from the second state into the first state when the shape memory polymer device is heated to a temperature near or above the glass transition temperature,
wherein the force provided by the spring is not large enough to transform the body from the second state into the first state when the shape memory polymer device is at a temperature below the glass transition temperature, and
wherein the spring is an internal spring that is disposed within the body.

2. The shape memory polymer device according to claim 1,
wherein in the first state the body is configured to couple with two distinct objects and to restrict the motion of the two distinct objects relative to one another, and
wherein in the second state the body allows motion of the two distinct objects relative to one another.

3. The shape memory polymer device according to claim 2, wherein the relative motion between the two objects is inhibited by mechanical interference of the body.

4. The shape memory polymer device according to claim 3, wherein the mechanical interference comprises at least one of a tab, a thread, or a factory head.

5. The shape memory polymer device according to claim 1, further comprising a resistive heat element coupled with the body.

6. The shape memory polymer device according to claim 1, wherein the shape memory polymer transitions to the first state at least in part through release of stored strain energy in the shape memory polymer material.

7. The shape memory polymer device according to claim 1, wherein in the first state the body carries a load between the two objects.

8. The shape memory polymer device according to claim 7, wherein in the first state a portion of the body collapses under the load when heated to a temperature above the glass transition temperature.

9. The shape memory polymer device according to claim 1, wherein the body transitions from the first state to the second state at least in part by releasing stored energy in the shape memory material when heated to a temperature at or near a glass transition temperature of the shape memory material.

10. The shape memory polymer device according to claim 1, wherein the spring exerts a compression force.

11. The shape memory polymer device according to claim 1, wherein the spring exerts a tensile force.

12. The shape memory polymer device according to claim 1, wherein the spring exerts a recovery force on the body that forces the body to the first state, wherein the first state is a natural state of the body.

13. The shape memory polymer device according to claim 1, wherein the spring comprises a resistive heating element.

* * * * *